(12) United States Patent
Patel

(10) Patent No.: US 10,499,666 B1
(45) Date of Patent: *Dec. 10, 2019

(54) OXYGEN FREE COCONUT WATER PROCESSING AND PACKAGING SYSTEM AND METHOD

(71) Applicant: Nilang Patel, Mableton, GA (US)

(72) Inventor: Nilang Patel, Mableton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/174,384

(22) Filed: Oct. 30, 2018

Related U.S. Application Data

(63) Continuation-in-part of application No. 16/024,805, filed on Jun. 30, 2018.

(51) Int. Cl.
| | | |
|---|---|---|
| *A23N 1/00* | (2006.01) | |
| *A23B 7/152* | (2006.01) | |
| *A23L 2/42* | (2006.01) | |
| *A23L 2/04* | (2006.01) | |
| *A23B 7/04* | (2006.01) | |
| *A23L 2/50* | (2006.01) | |
| *B65B 3/04* | (2006.01) | |
| *B65B 25/00* | (2006.01) | |
| *B65B 55/04* | (2006.01) | |
| *B65B 55/12* | (2006.01) | |
| *A23L 2/74* | (2006.01) | |

(52) U.S. Cl.
CPC .................... *A23L 2/04* (2013.01); *A23B 7/04* (2013.01); *A23B 7/152* (2013.01); *A23L 2/50* (2013.01); *A23L 2/74* (2013.01); *A23N 1/00* (2013.01); *B65B 3/04* (2013.01); *B65B 25/001* (2013.01); *B65B 55/04* (2013.01); *B65B 55/12* (2013.01); *A23V 2002/00* (2013.01)

(58) Field of Classification Search
None
See application file for complete search history.

(56) References Cited

U.S. PATENT DOCUMENTS

| | | |
|---|---|---|
| 1,506,571 A | 8/1924 | Derember |
| 3,106,571 A | 10/1963 | Birosel |
| (Continued) | | |

FOREIGN PATENT DOCUMENTS

| | | |
|---|---|---|
| AT | 501237 A1 | 7/2006 |
| BE | 9905617 | 11/2009 |
| (Continued) | | |

*Primary Examiner* — Tamra L. Dicus
(74) *Attorney, Agent, or Firm* — H. Brock Kolls

(57) ABSTRACT

The present invention relates an oxygen free coconut water processing and packaging method. The method comprising the steps of establishing an inert trusted transfer environment and penetrating shell of a coconut with at least one of a self sealing probe. The method then modifies an atmospheric condition within the coconut by providing the inert gas at a desired atmospheric pressure to engender flow of the coconut water through an egress port. The coconut water is then sterilized by way of a cold micro-filter array. The method then circulating the coconut water between a chiller and the oxygen free collection vessel to maintain the coconut water at a predetermined chill temperature until filling. Product packages are filled within an aseptic ultra clean environment that encompasses the filler. The method also includes options for oxygen free cold brewing of coffee, teas, and other using coconut water.

27 Claims, 18 Drawing Sheets

(56) References Cited

U.S. PATENT DOCUMENTS

| | | | |
|---|---|---|---|
| 8,586,119 B2 * | 11/2013 | Patel | ........................ A23N 1/00 |
| | | | 426/330.5 |
| 8,679,562 B2 * | 3/2014 | Patel | ........................ A23N 1/00 |
| | | | 426/330.5 |
| 2004/0018285 A1 | 1/2004 | Haynes | |
| 2008/0178750 A1 | 7/2008 | Rogers et al. | |
| 2009/0291172 A1 | 11/2009 | Saez | |
| 2010/0055269 A1 | 3/2010 | Haynes | |
| 2011/0142995 A1 | 6/2011 | Hinds | |
| 2013/0156914 A1 | 6/2013 | Patel | |
| 2013/0156915 A1 | 6/2013 | Patel | |

FOREIGN PATENT DOCUMENTS

| | | |
|---|---|---|
| CN | 201667965 | 12/2010 |
| DE | 19853804 A1 | 5/2000 |
| DE | 19853804 C2 * | 6/2002 |
| GB | 2323549 A | 9/1988 |
| JP | 09-2888 | 9/1997 |

* cited by examiner

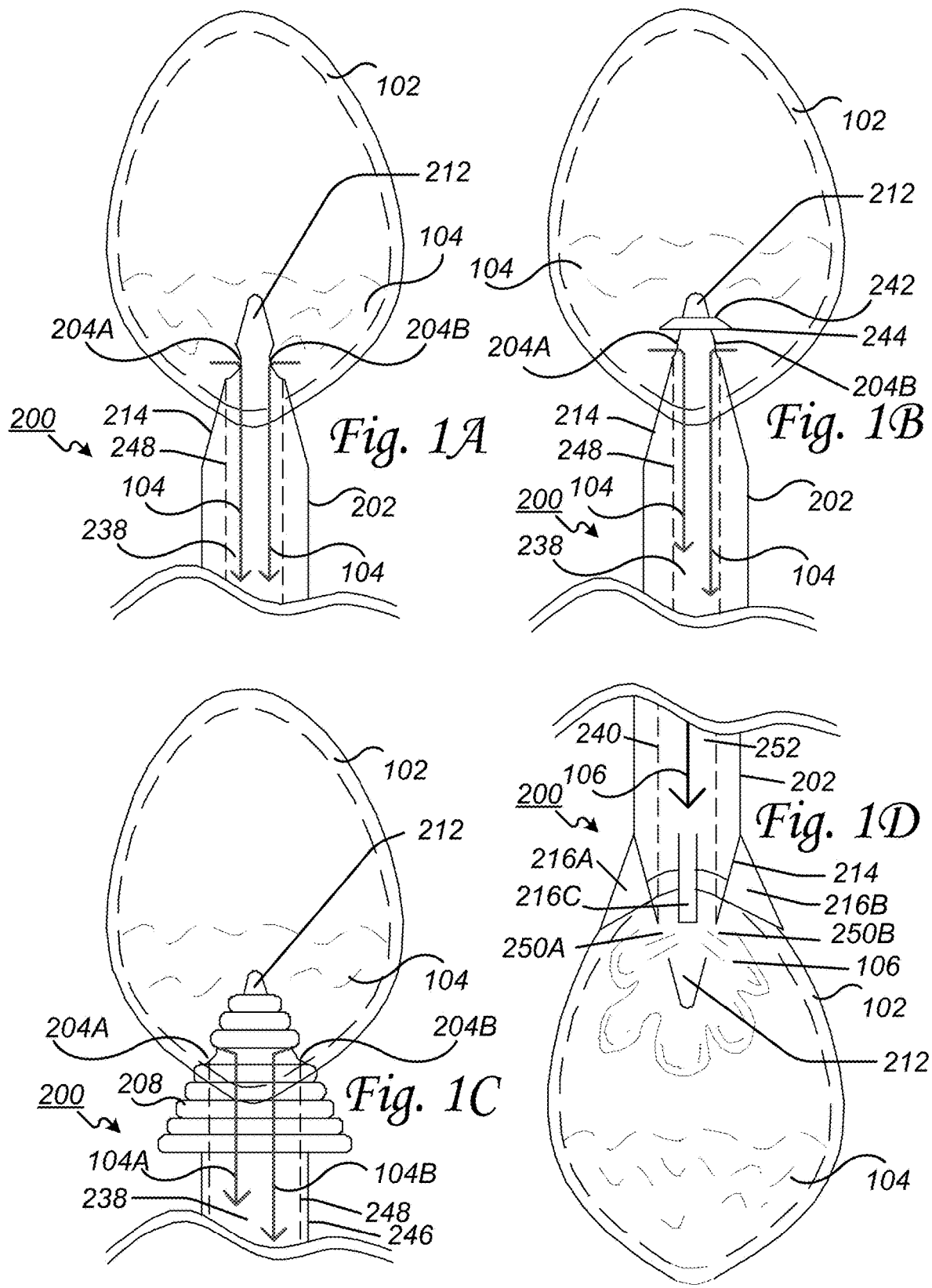

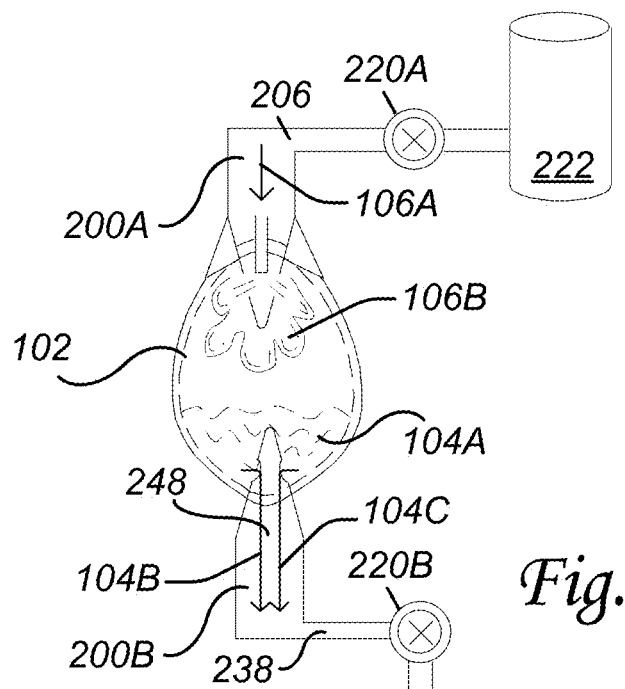
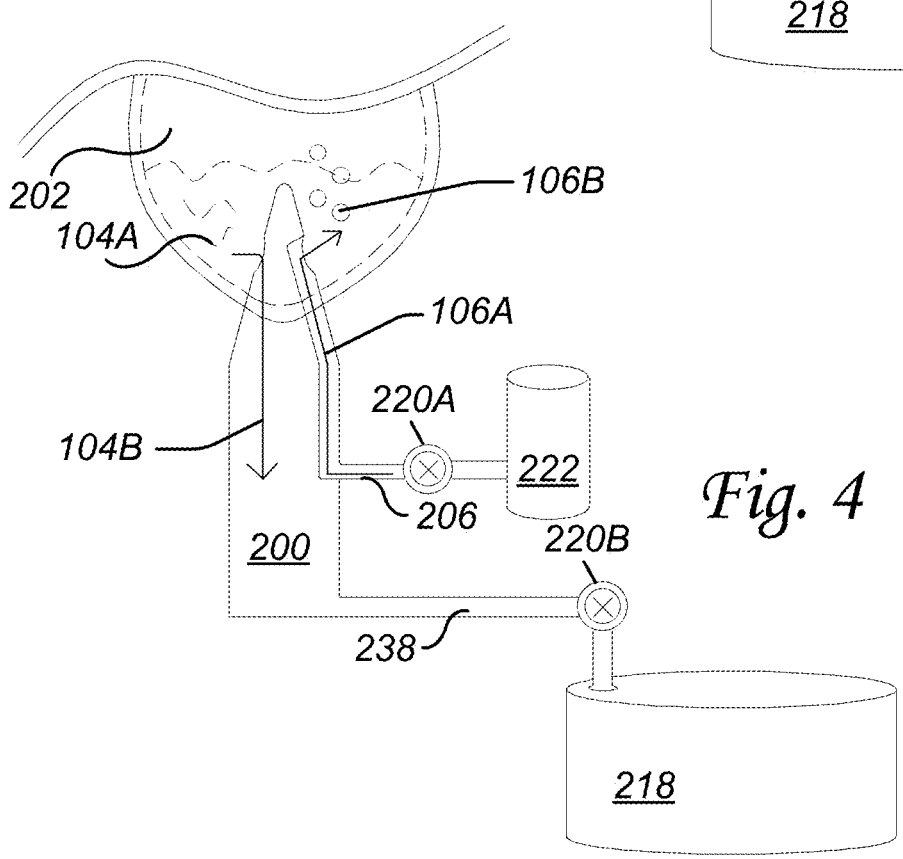
Fig. 3
Fig. 4

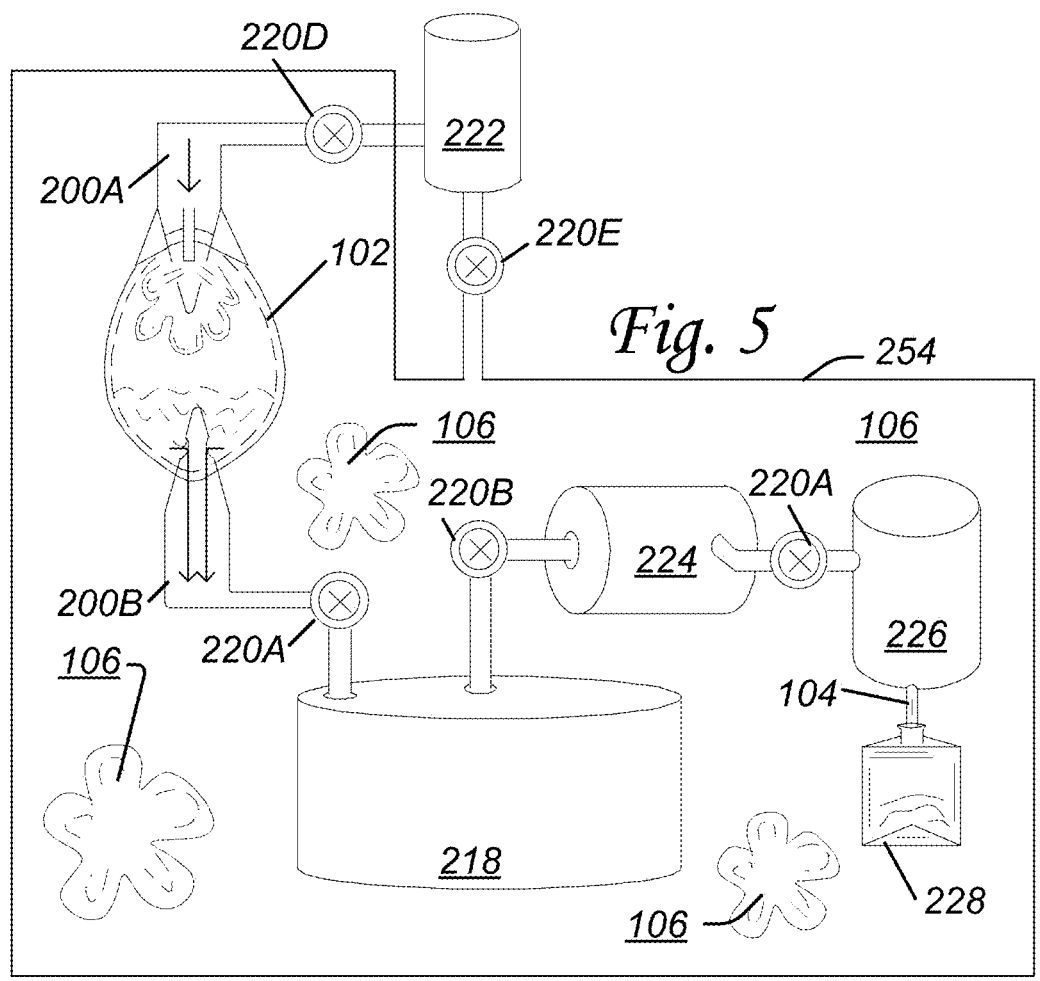
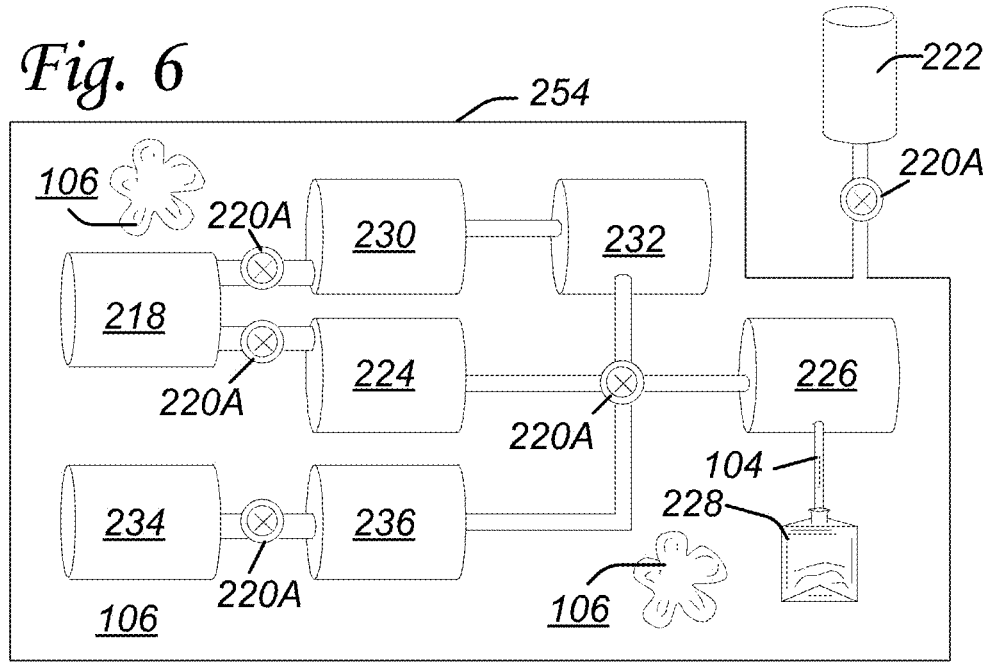

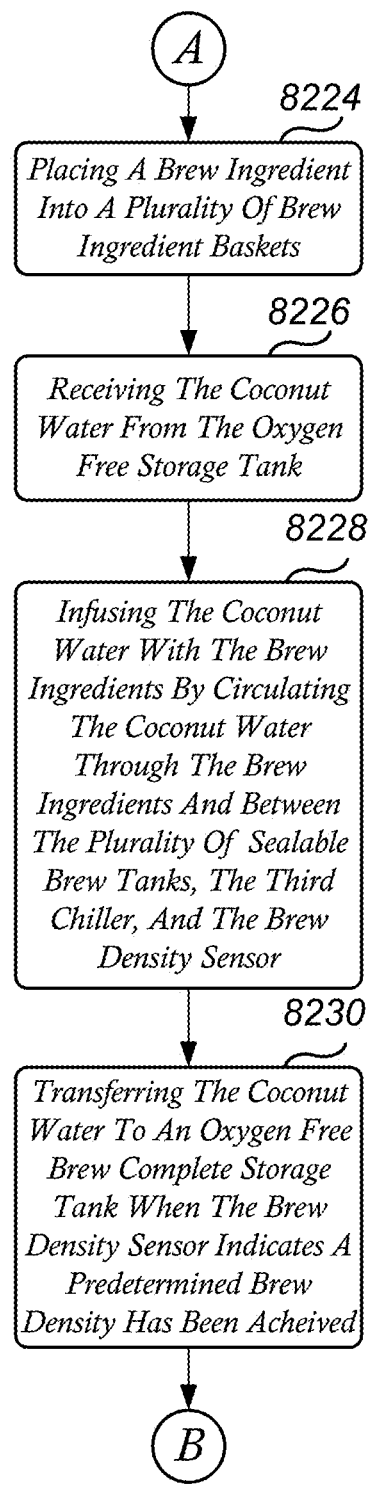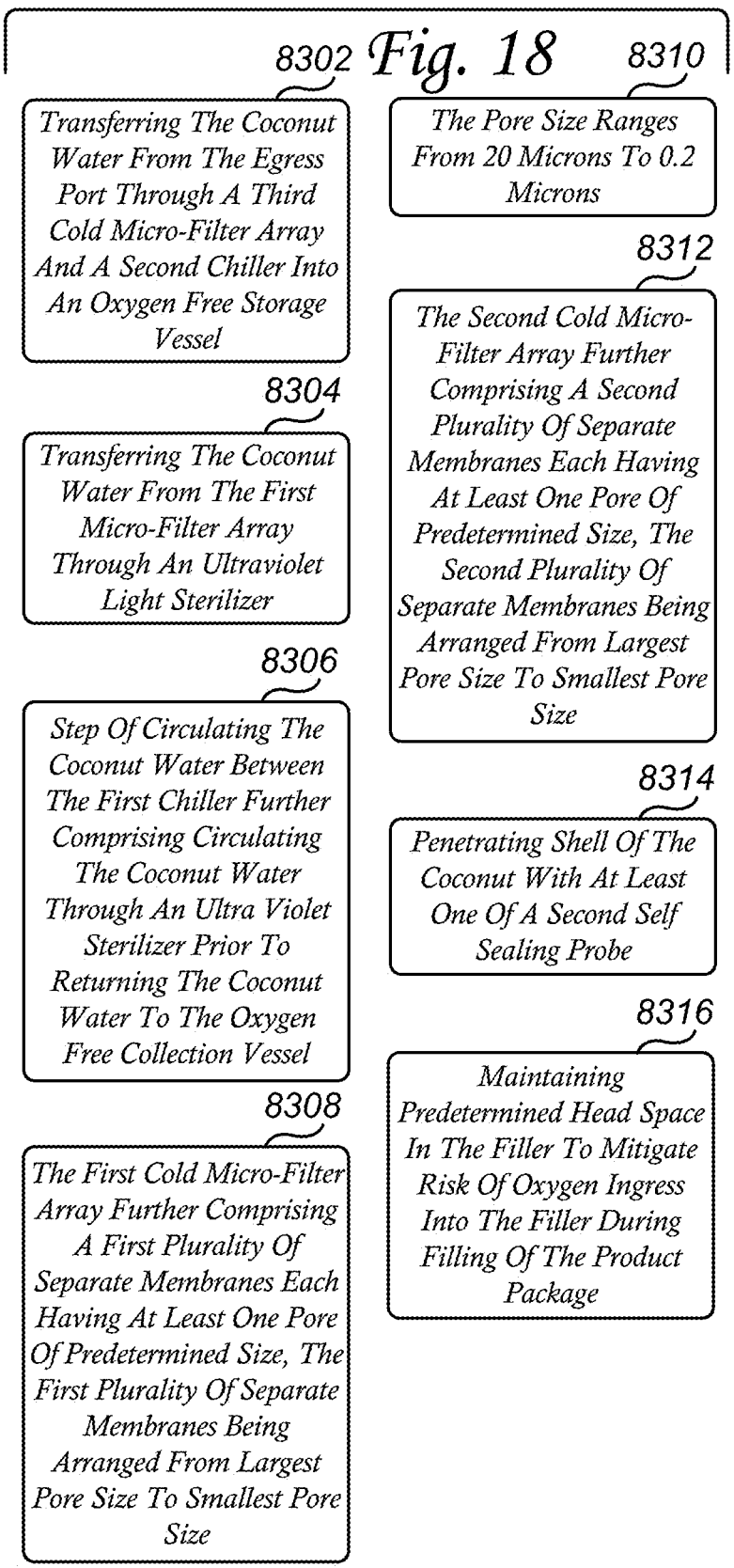

OXYGEN FREE COCONUT WATER PROCESSING AND PACKAGING SYSTEM AND METHOD

CROSS-REFERENCE TO RELATED APPLICATIONS

This application contains subject matter which is related to the subject matter of the following co-pending application. The below listed application is hereby incorporated herein by reference in its entirety:

This is a U.S. non-provisional application that is a continuation in part of a U.S. non-provisional application Ser. No. 16/024,805, inventor Nilang Patel, entitled "EXTRACTING AND PACKAGING COCONUT WATER BASED PRODUCTS IN AN INERT ATMOSPHERIC ENVIRONMENT", filed Jun. 30, 2018.

TECHNICAL FIELD OF THE INVENTION

This invention relates to an oxygen free coconut water processing and packaging method. The method providing for packaging coconut water and cold brewed products such as coffee, tea, and other using coconut water.

BACKGROUND OF THE INVENTION

Before our invention, prior art practices of extracting coconut water from a coconut, in the presence of air containing oxygen, unintentionally compromised the quality of the coconut water. In this regard, by allowing the coconut water to contact oxygen, in the air, chemical reactions, in the coconut water, are initiated. These reactions cause oxidation to rapidly degrade the coconut water flavor, color or clarity, nutritional or nutrient benefits, and/or degrade or impact other attributes of the coconut water that are sensitive to oxidation reactions.

Another shortcoming of prior art practices can be that since oxygen degrades the attributes of coconut water so quickly, growers may often be left with hoping that consumers will be unaware that their harvesting and coconut water extraction practices can be harmful to the consumer benefits associated with the coconut water. In this regard, prior art coconut water extraction practices can often nullify many of the consumer benefits, of the coconut water, long before it reaches the consumer.

Another shortcoming of prior art practices can be that for those growers that make an attempt to maintain some consumer benefit value, in their coconut water, post-harvest, the growers are often forced to undertake costly measures. On such measure can be transporting the coconuts to a remote location far from the grove but closer to the consumer for processing. This measure can be an attempt to harvest the coconut water, exposing the water to oxygen during extraction, but then trying to use the coconut water quickly before oxidation degradation destroys all of the consumer benefit attributes. This is a very costly approach with not real net benefit which extends shelf life of the coconut water.

Another shortcoming of prior art practices can be that coconut water extracted, in the presence of oxygen, starts a degradation process that in large part limits the coconut water, if extracted locally, from being transported to foreign countries and arrive in a grove-fresh state. In this regard, by the time the extracted coconut water arrives in a foreign country it is likely that the oxygen has oxidized the coconut water, irreversibly damaging the flavors, color or clarity, nutritional or nutrient benefit, and/or damaging other attributes of the coconut water.

Another shortcoming can be the handling of the coconut water during the transfer and processing from coconut to packaged product. In this regard, even if care is taken to extract the coconut water from the coconut, minimizing exposure to oxygen, subsequent handling, transfer, and processing through equipment to final product packaging can expose the coconut water to oxygen.

For these reasons and shortcomings as well as other reasons and shortcomings there is a long felt need that gives rise to the present invention.

SUMMARY OF THE INVENTION

Shortcomings of the prior art are overcome and additional advantages are provided through the provision of an oxygen free coconut water processing and packaging method. The method comprising the steps of establishing an inert trusted transfer environment by injecting an inert gas substantially throughout the oxygen free coconut water processing and packaging pathway.

The method continues by penetrating shell of a coconut with at least one of a self sealing probe, modifying an atmospheric condition within the coconut by providing the inert gas at desired atmospheric pressure to engender flow of the coconut water through an egress port. The coconut water received from the egress port is sterilized by way of transfer through a first cold micro-filter array and received in an oxygen free collection vessel.

The method continues by circulating the coconut water between a first chiller and the oxygen free collection vessel to maintain the coconut water at a predetermined chill temperature. Then when ready to package, transferring the coconut water from the oxygen free collection vessel selectively through a second cold micro-filter array into a filler.

The method continues by sterilizing a packaged product, unfilled, and a closure by way of the package sterilizer and introducing the packaged product and the closure into an aseptic ultra clean environment, the filler is located within the aseptic ultra clean environment. Finally, the packaged product is filled by way of the filler and affixing the closure to the packaged product within the aseptic ultra clean environment.

Additional shortcomings of the prior art are overcome and additional advantages are provided through the provision of an oxygen free coconut water processing and packaging method. The method comprising the steps of establishing an inert trusted transfer environment, penetrating shell of a coconut with at least one of a self sealing probe the self sealing probe further comprising an egress port, and penetrating shell of the coconut with at least one of a second self sealing probe, the second self sealing probe further comprising a gas inlet.

The method continues by modifying an atmospheric condition within the coconut by providing an inert gas by way of an inert gas source at desired atmospheric pressure to engender flow of the coconut water through the egress port. The coconut water received from the egress port is transferred through a first cold micro-filter array into an oxygen free collection vessel.

The method continues by circulating the coconut water between a first chiller and the oxygen free collection vessel to maintain the coconut water at a predetermined chill temperature. Then when ready to package, transferring the coconut water through a second cold micro-filter array into a filler. A packaged product, unfilled, and a closure are sterilized by way of the package sterilizer and introduced into an aseptic ultra clean environment where the filler is located. Finally, the packaged product is filled and sealed.

Additional shortcomings of the prior art are overcome and additional advantages are provided through the provision of an oxygen free coconut water processing and packaging method. The method comprising the steps of establishing an inert trusted transfer environment, penetrating shell of a coconut with at least one of a self sealing probe, and modifying an atmospheric condition within the coconut by providing an inert gas at desired atmospheric pressure to engender flow of the coconut water through the egress port.

The method continuing by sterilizing the coconut water by way of transfer through a first cold micro-filter array, receiving the coconut water in an oxygen free collection vessel, and circulating the coconut water between a first chiller and the oxygen free collection vessel to maintain the coconut water at a predetermined chill temperature.

The method continues by transferring the coconut water from the oxygen free collection vessel selectively through either a second cold micro-filter array into a filler or through an oxygen free cold brew processing platform and then through the second cold micro-filter array into the filler. Finally when ready to package, sterilizing a packaged product, unfilled, and a closure by way of the package sterilizer, introducing the packaged product into an aseptic ultra clean environment where the filler is located, and filling the packaged product.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 1A-1E illustrates example of a self sealing probe for extracting coconut water from a coconut while preventing oxygen from contacting the coconut water during extraction from the coconut;

FIGS. 2-4 illustrate examples of a system and method for preventing oxygen from contacting coconut water during extraction from a coconut;

FIGS. 5-6 illustrate examples of transferring and processing equipment for packaging products containing at least a portion of coconut water;

FIGS. 15, 16, 17A-17B, and 18 illustrates examples of an oxygen free coconut water processing and packaging method.

Figure 1E:
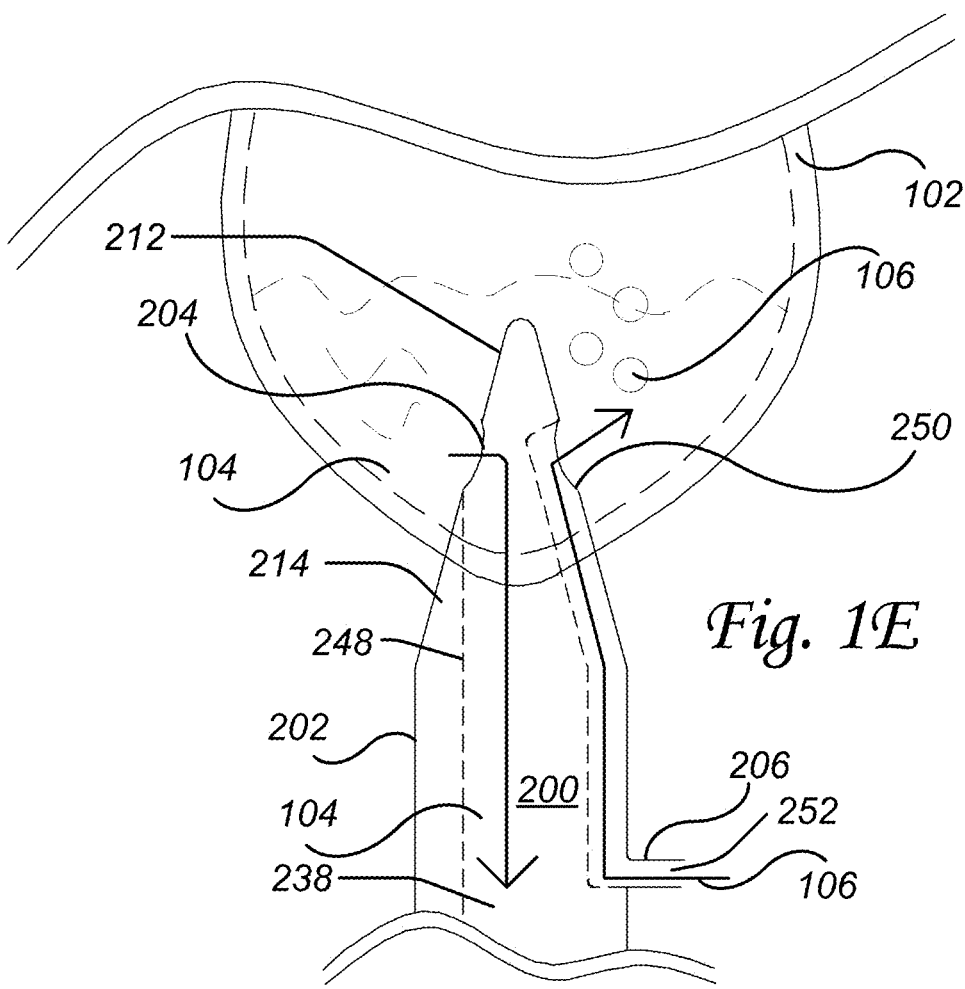

The detailed description explains the preferred embodiments of the invention, together with advantages and features, by way of example with reference to the drawings.

DETAILED DESCRIPTION OF THE INVENTION

With regards to the consumer benefits of coconut water, coconut water comprises organic compounds possessing healthy growth promoting properties that have been known to help keep the human body cool and at the proper temperature, orally re-hydrate the body, it is an all natural isotonic beverage, carries nutrients and oxygen to the cells, and naturally replenishes the body's fluids after exercising. In addition, other coconut water benefits can include raising the body's metabolism, promoting weight loss, boosting the body's immune system, detoxifying and fighting viruses, and cleansing the body's digestive tract. Furthermore, other coconut water benefits can include controlling diabetes, aiding the body in fighting viruses that cause the flu, herpes, and AIDS, balancing the body's PH and reducing the risk of cancer, treating kidney and urethral stones, and boosting poor circulation. Coconut water is also low in carbohydrates, 99% fat free, and low in sugar. In the presence of oxygen, oxidation of the coconut water begins degrading many of the consumer benefits mention above, as well as degrading other consumer benefits. Such oxidation degrades coconut water quickly. If the coconut water is not extracted and stored in an oxygen free manner and environment, the normal delay in reaching the consumer may mean that the consumer may never realize the benefits of consuming or using the coconut water based products.

Another advantage of the present invention is that the coconut water is extracted from the coconut in a manner which prevents oxygen in the air from contacting the coconut water during extraction from the coconut. In this regard, the environment inside the coconut prior to breech is oxygen free; prior art methods of cracking the coconut to get the coconut water out of the coconut exposes the coconut water to oxygen. As soon as oxygen contacts the coconut water certain chemical and oxidation reactions begin. These chemical and oxidation reactions very quickly degrade the flavor, color or clarity, nutritional or nutrient value, and/or degrade or impact other attributes of the coconut water that are sensitive.

These reactions begin quickly and within the first 48 hours of exposure to oxygen much of the high quality benefits of flavor, color or clarity, nutritional or nutrient value, and other attributes of the coconut water can be degraded or impacted to the point the product quality is irreversibly damaged and can be perceived by the consumer in lacking at least freshness, nutritional benefit, and fortification. The present invention extracts coconut water in a manner which prevents oxygen from contacting the coconut water during extraction from the coconut. Furthermore, the extracted coconut water is stored in an oxygen free collection vessel. The system and method of the present invention prevents oxygen from contacting the coconut water during extraction and subsequent storage and as a result the flavor, color or clarity, nutritional or nutrient value, and/or other attributes of the coconut water are preserved. This translates into delivering to the consumer a better product that has fresher taste with superior well protected consumer benefits, as compared to prior art coconut water extraction practices.

Use of the term 'gas', 'inert gas', or 'noble gas', in the present invention, is intended to include any gas that does not chemically react with other substances, such as coconut water, except maybe under certain special conditions. As an example and not a limitation such gas, inert gas, and/or noble gas as defined can include nitrogen, helium, neon, argon, krypton, xenon, radon, and other gases that do not chemically react with other substances, such as coconut water, except maybe under certain special conditions, as may be required and/or desired in a particular embodiment. For disclosure purposes gas, inert gas, and noble gas can be referred to as gas. In addition, nitrogen is considered to be a mostly inert diatomic gas at standard conditions.

For disclosure purposes a packaged product 228 can be a beverage product, a beauty care product, or other type or kind of product, as may be required and/or desired in a particular embodiment.

Turning now to the drawings in greater detail, it will be seen that in FIG. 1A there is illustrated one example of a self sealing probe 200 for extracting coconut water 104 from a coconut 102 while preventing oxygen from contacting the coconut water 104 during extraction from the coconut 102. In an exemplary embodiment, a self sealing probe 200 can comprise a tapered shaft 202 having a pointed end 212 oriented to penetrate a coconut 102, the pointed end 212 blends into a gradually widening portion 214 which forms a pressure fit on entry into the coconut 102 between the outer surface of the gradually widening portion 214 and shell of the coconut 102. The self sealing probe 200 further comprising at least one of an egress port 248. The egress port 248 having at least one of a first opening 204A (a second opening is illustrated as 204B) near the pointed end 212 to receive the coconut water 104 and at least one of a second opening 238 exterior to the coconut 102 which is in fluid communication with the oxygen free collection vessel 218. The coconut water 104 traversing the interior of the self sealing probe 200. At least FIGS. 1A, 3, and 4 illustrate the flowing of the coconut water 104 through the egress port 248 openings 202A and 202B traversing the interior of the self sealing probe 200 and exiting the self sealing probe 200 by way of the second opening 238 into the oxygen free collection vessel 218.

In operation, at least one of the self sealing probe 200 penetrates the shell of the coconut 102, the self sealing probe 200 forming a seal between the shell of the coconut 102 and the outer surface of the self sealing probe 200 preventing non-inert gases from ingress into the coconut 102 contacting the coconut water 104 therein and preventing the coconut water 104 from egress along the outer surface of the self sealing probe 200. Rather, the coconut water 104 traverse the interior egress port 248 of the self sealing probe 200 in route to the oxygen free storage vessel 218.

Referring to FIG. 1B there is illustrated one example of a self sealing probe 200 for extracting coconut water 104 from a coconut 102 while preventing oxygen from contacting the coconut water 104 during extraction from the coconut 102. In an exemplary embodiment, a tapered shaft 202 having a pointed end 212 and a ribbed end 242 is orientated to penetrate the coconut 102. A gradually widening portion 214 having a narrow top and a wider bottom, the narrow top blends with the ribbed end 242. At least a portion of the narrow top being of smaller diameter than the ribbed end 242 so that at least a portion of the ribbed end 242 forms an overhang 244, the wider bottom is larger in diameter than the ribbed end 242, the gradually widening portion 214 forms a pressure fit on entry into the coconut 102 between the outer surface of the gradually widening portion 214 and the shell of the coconut 102.

The self sealing probe further comprising at least one of an egress port 248. The egress port 248 having at least one of a first opening 204A (a second opening is illustrated as 204B) near the overhang 244 to receive the coconut water 104 and at least one of a second opening 238 exterior to the coconut 102 which is in fluid communication with the oxygen free collection vessel 218. The overhang 242 minimizes material from the shell of the coconut 102 from clogging the first openings 204A and 204B during insertion of the self sealing probe 200 into the coconut 102.

In operation, at least one of the self sealing probe 200 penetrates the shell of the coconut 102, the self sealing probe 200 forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe. Rather, the coconut water 104 traverses the interior egress port 248 of the self sealing probe 200 in route to the oxygen free storage vessel 218.

Referring to FIG. 1C there is illustrated one example of a self sealing probe 200 for extracting coconut water 104 from a coconut 102 while preventing oxygen from contacting the coconut water 104 during extraction from the coconut 102. In an exemplary embodiment, a shaft 246 having a pointed end 212 orientated to penetrate the coconut 102, the pointed end 212 blends into a plurality of concentric ribs 208 of increasing diameter which forms a pressure fit on entry into the coconut 102 between the outer surface of the plurality of concentric ribs 208 and the shell of the coconut 102.

The self sealing probe 200 further comprising at least one of an egress port 248. The egress port 248 further comprising at least one of a first opening 204A (a second opening is illustrated as 204B) near the pointed end 212 which receives the coconut water 104 and at least one of a second opening 238 exterior to the coconut 102 which is in fluid communication with the oxygen free collection vessel 218.

Referring to FIG. 1D there is illustrated one example of a self sealing probe 200 for extracting coconut water 104 from a coconut 102 while preventing oxygen from contacting the coconut water 104 during extraction from the coconut 102. In an exemplary embodiment, a tapered shaft 202 having a pointed end 212 for penetrating the coconut 102, the pointed end 202 blends into a gradually widening portion 214 which forms a pressure fit on entry into the coconut 102 between the outer surface of the gradually widening portion 214 and the shell of the coconut 102.

The self sealing probe 200 further comprising at least one of a coconut stabilizer 216A (also illustrated coconut stabilizers 216B and 216C). The coconut stabilizer 216A is formed on the outer surface of the self sealing probe 200, the coconut stabilizer 216A making contact with the shell of the coconut 102 outer surface when the self sealing probe 200 is inserted into the coconut 102, wherein the coconut stabilizer 216A, 216B, and 216C mitigate the coconut 102 movement and improves the integrity of the seal between the shell of the coconut 102 and the outer surface of the self sealing probe 200 during extraction of the coconut water 104.

The self sealing probe further comprising a gas inlet 240. The gas inlet 240 having at least one of a first gas opening 250A. The first gas opening 250A is exposed to the interior of the coconut 102 when the self sealing probe 200 is inserted into the coconut 102 and at least one of a second gas opening 252 exterior to the coconut 102 which is operational coupled to an inert gas supply 222.

In operation, an atmospheric condition can be modified within the coconut 102 by providing an inert gas 106 by way of an inert gas source 222 at a desired atmospheric pressure through the gas inlet 240, the atmospheric condition being selected to engender flow of the coconut water 104 through an egress port 248 which not shown in this Figure. The coconut water 104, from the coconut 102, is transferred by way of the egress port 248, traversing the interior of the self sealing probe 200, into an oxygen free collection vessel 218.

In an exemplary embodiment, the gas inlet 240 provides an inert gas 106 by way of an inert gas source 222 which modifies an atmospheric condition, within the coconut 102, to a desired atmospheric pressure, the atmospheric condition being selected to engender flow of the coconut water 104 from the coconut 102 through interior of the egress port 248 into the oxygen free collection vessel 218 protecting the coconut water 104 from exposure to oxygen.

Referring to FIG. 1E there is illustrated one example of a self sealing probe 200 for extracting coconut water 104, from a coconut 102, while preventing oxygen from contacting the coconut water 104 during extraction from the coconut 102. In an exemplary embodiment, a self sealing probe comprises a tapered shaft 202 having a pointed end 212 for penetrating the coconut 102, the pointed end 212 blends into a gradually widening portion 214 which forms a pressure fit on entry into the coconut 102 between the outer surface of the gradually widening portion 214 and the shell of the coconut 102.

The self sealing probe 200 further comprising an egress port 248. The egress port 248 having at least one of a first opening 204 near the pointed end 212 to receive the coconut water 104 and at least one of a second opening 238 exterior to the coconut 102 which is in fluid communication with the oxygen free collection vessel 218.

The self sealing probe 200 further comprising a gas inlet 206. The gas inlet 206 having at least one of a first gas opening 250 is exposed to the interior of the coconut 102 when the self sealing probe 200 is inserted into the coconut 102 and at least one of a second gas opening 252 exterior to the coconut which is operationally coupled to an inert gas supply 222 which provides an inert gas 106.

In operation, the self sealing probe 200 is forcefully caused to penetrate the shell of a coconut 102, the self sealing probe 200 forming a seal between the shell of the coconut 102 and the outer surface of the self sealing probe 200 preventing non-inert gases such as oxygen from ingress into the coconut 102 contacting a coconut water 104 therein and preventing the coconut water 104 from egress along the outer surface of the self sealing probe 200.

An atmospheric condition within the coconut 102 is modified by providing an inert gas 106 by way of an inert gas source 222 at a desired atmospheric pressure through a gas inlet 206 into the coconut 102, the atmospheric condition being selected to engender flow of the coconut water 104 through the egress port 248. The coconut water 104 is transferred from the coconut 102 by way of the egress port 248 traversing the interior of the self sealing probe 200 into an oxygen free collection vessel 218.

Figure 2:
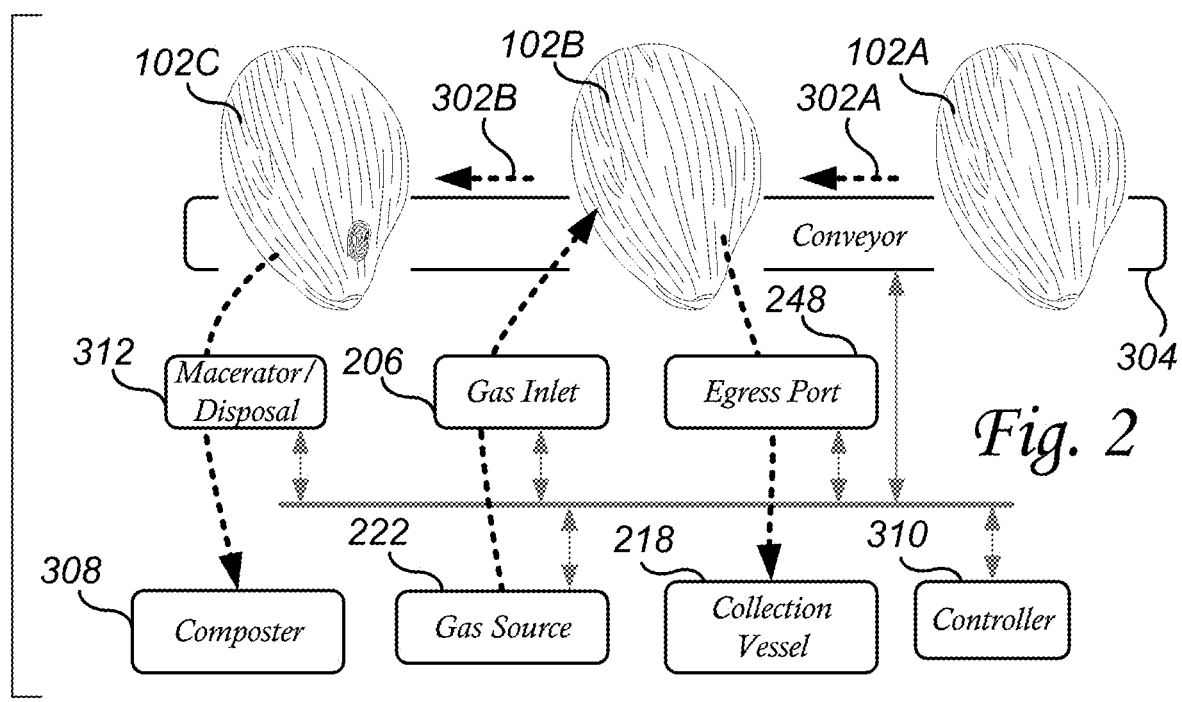

Referring to FIG. 2 there is illustrated one example of a system and method for preventing oxygen in the air from contacting coconut water 104 during extraction from a coconut 102. In an exemplary embodiment, a coconut 102A can be conveyed by a conveyor 304 to a coconut water extraction point 302A. An egress port 248 and a gas inlet 206 can be inserted or otherwise penetrate the coconut 102B shell to reach the coconut water 104 inside the coconut 102. The insertion of the egress port 248 and gas inlet 206 is done in a manner as not to allow non-inert gas such as oxygen to reach the coconut water 104. The egress port 248 is in fluid communication with a collection vessel 218. The gas inlet 206 is in communication with an inert gas source 222. Such an inert gas 106 can be a gas such as nitrogen, or other inert and/or noble gas, as may be required and/or desired in a particular embodiment. For purposes of disclosure coconut 102A-C can be referred to as coconut 102. In an exemplary embodiment, for example and not a limitation, conveyor 304 can be a linear track type conveyor, a rotary turn style type conveyor, and/or other types and kinds of conveyors, as may be required and/or desired in a particular embodiment.

In an exemplary embodiment, in operation, an inert gas at desired atmospheric pressure is discharged into the coconut 102B. The inert gas 106 is discharge into the coconut 102B in part to cause the coconut water 104 to egress the coconut 102 through the egress port 248 into the oxygen free collection vessel 218. Once the coconut water 104 has been extracted from the coconut 102B, the conveyor 304 conveys the coconut 102B to a maceration or disposal location 302B. The coconut 102C is then macerated by macerator 312 or otherwise disposed and turned into composting material by composter 308.

In an exemplary embodiment, a controller 310 is operationally related to the conveyor 304, egress port 248, inert gas inlet 206, inert gas source 222, macerator 312, and/or other operational elements of the system, as may be required and/or desired in a particular embodiment. In a first exemplary embodiment, a self sealing probe 200 can comprise the gas inlet 206 and the egress port 248. In a second exemplary embodiment, two self sealing probes 200 can be used, one comprising the egress port 248 and the other comprising the inert gas inlet 206.

Referring to FIG. 3 there is illustrated one example of a system and method for preventing oxygen from contacting coconut water 104 during extraction from a coconut 102. In an exemplary embodiment, two self sealing probes 200A and 200B can be used during the coconut water 104A extraction. The first self sealing probe 200A is positioned at one end of the coconut 102 and the second self sealing probe 200B is positioned opposite the first self sealing probe 200A. The first self sealing probe 200A and the second self sealing probe 200B can be orientated at other opposing angles, as may be required and/or desired in a particular embodiment.

In operation, mechanical or other force of convenience causes the two self sealing probes 200A and 200B to pierce the coconut 102 shell and enter the interior of the coconut 102. An atmospheric condition is modified within the coconut 102 by providing an inert gas 106A and 106B by way of an inert gas source 222 at a desired atmospheric pressure through a gas inlet 206 into the coconut 102, the atmospheric condition being selected to engender flow of the coconut water 104A, 104B, and 104C through the egress port 248. The coconut water 104 is transferred from the coconut 102 by way of the egress port 248 traversing the interior of the self sealing probe 200B, exiting the self sealing probe 200B by way of egress port opening 238, and collected in an oxygen free collection vessel 218.

General purpose valves 220A and 220B can be used for system component connectivity and aid in system operation and flow control. In an exemplary embodiment, the atmospheric condition selected can be a positive inert gas pressure 106B to force the coconut water 104A to egress the coconut by way of the egress port 248. The atmospheric condition selected can vary, as maybe required and/or desired in a particular embodiment.

Referring to FIG. 4 there is illustrated one example of a system and method for preventing oxygen from contacting coconut water 104 during extraction from a coconut 102. In an exemplary embodiment, a single self sealing probe 200 having both an egress port 248 and a gas inlet 206 can be used to extract the coconut water 104A.

In operation, mechanical or other suitable choice of force causes the self sealing probes 200 to pierce the coconut 102 shell and enter the interior of the coconut 102. An atmospheric condition is modified within the coconut 102 by providing an inert gas 106A and 106B by way of an inert gas source 222, at a desired atmospheric pressure, through a gas inlet 206 into the coconut 102, the atmospheric condition being selected to engender flow of the coconut water 104A and 104B through the egress port 248. The coconut water 104 is transferred from the coconut 102 by way of the egress port 248 traversing the interior of the self sealing probe 200, exiting the self sealing probe 200 by way of the egress port opening 238, and collected in an oxygen free collection vessel 218.

General purpose valves 220A and 220B can be used to system component connectivity and aid in system operation and flow control. In an exemplary embodiment, the atmospheric condition selected can be a positive inert gas pressure 106B to force the coconut water 104A to egress the coconut 102 by way of the egress port 248. The atmospheric condition selected can vary, as maybe required and/or desired in a particular embodiment.

Referring to FIG. 5 there is illustrated one example of transferring and processing equipment for packaging products containing at least a portion of coconut water. In an exemplary embodiment, an inert trusted transfer environment 254 can be established which entraps certain of the coconut water 104 transfer and processing equipment in an inert atmospheric encasement created by inert gas 106, preventing non-inert gas, such as oxygen, contact with the coconut water 104 during transfer and processing from a coconut water storage source 218 to a packaged product, wherein the packaged product containing at least portion of the coconut water 104. Such transfer and processing equipment can include oxygen free collection vessel 218 also referred to as a coconut water storage sources 218. Other transfer and processing equipment can include filtration equipment 224, such as a cold filter system to remove any microbiological pathogens and other filtering, as may be required and/or desired in a particular embodiment. Additional transfer and processing equipment can also include filler 226 used to fill package 228 and valves 220A, 220B, and 220C.

Furthermore, in an exemplary embodiment, the extracted coconut water 104 can be transferred from the egress port 248 through an inert trusted transfer environment 254 which entraps certain of the coconut water transfer and processing equipment in an inert atmospheric encasement created by inert gas 106, preventing non-inert gas, such as oxygen, contact with the coconut water 104 during transport to the oxygen free collection vessel 218. In this regard, in a plurality of exemplary embodiments, the transfer and processing equipment can vary and as little as one piece of equipment can be encased. As example and not a limitation, the self sealing probes 200A and 200B and optionally the coconut 102 can be encased in an inert atmospheric environment. In another example and not a limitation the filler 226 and package 228 can be encased in an inert atmospheric environment.

Such an inert trusted transfer environment 254 can be established which entraps certain of the coconut water 104 transfer and processing equipment can be created by wrapping a piece of equipment and injecting the inert gas 106 between the equipment and wrap layer. It can also be created by placing equipment in an enclosed area and injecting the inert gas 106 into the closed area displacing and air that is present. It can also be created by dosing package 228 and other vessels with the inert gas 106 to displace the air inside, creating an inert trusted transfer environment within the package 228. At least FIGS. 5 and 6 illustrate this by placing a boundary around the equipment and showing an inert gas 106 environment around the equipment and package 228.

Referring to FIG. 6 there is illustrated one example of transferring and processing equipment for packaging products containing at least a portion of coconut water. In an exemplary embodiment, a heat treatment coconut water portion can be sterilized by way of heat treatment 230. The heat treatment coconut water portion can be mixed with the coconut water processed by way of the cold filter system 224. In this regard, a plurality of desirable organic compounds that were removed from the coconut water 104 when passed through the cold filter system 224 is restored to the coconut water 104 by way of the (unfiltered) heat treatment coconut water portion. In an exemplary embodiment, the plurality of useful compounds can include amino acids, nutrients, and other useful organic compounds.

To elaborate, microfiltration by way of filtration system 224 can stripe everything larger than the filter pore size, as example in the range of 0.1 microns. While making the coconut water 104 sterile by removing the biological pathogens, the small pore size can also remove some of the useful organic compounds from the coconut water. To restore the useful compounds a portion of coconut water 104 is heat treated to sterilize by way of heat treatment system 230. Additional post processing 232 can be used as necessary such as cooling or storing temporarily the heat treated portion or other post process, as may be required and/or desired in a particular embodiment.

In another exemplary embodiment, at least one of an additive can be dosed by way of doser 236 into the coconut water 104. In this regard, flavor, color, nutrients, nutraceuticals, and other additives, as may be required and/or desired can be dosed into the coconut water 104. The doser 236 receives the additive material from an additive supply 234 which is operationally connected.

Such an inert trusted transfer environment 254 which entraps certain of the coconut water 104 transfer and processing equipment can be established by wrapping a piece of equipment and injecting the inert gas 106 between the equipment and wrap layer. It can also be created by placing equipment in an enclosed area and injecting the inert gas 106 into the closed area displacing and air that is present. It can also be created by dosing package 228 and other vessels to displace the air with oxygen inside, in effect creating an inert trusted transfer environment within the package 228. At least FIGS. 5 and 6 illustrate this by placing a boundary around the equipment and showing an inert gas 106 environment around the equipment and package 228.

Figure 7A:
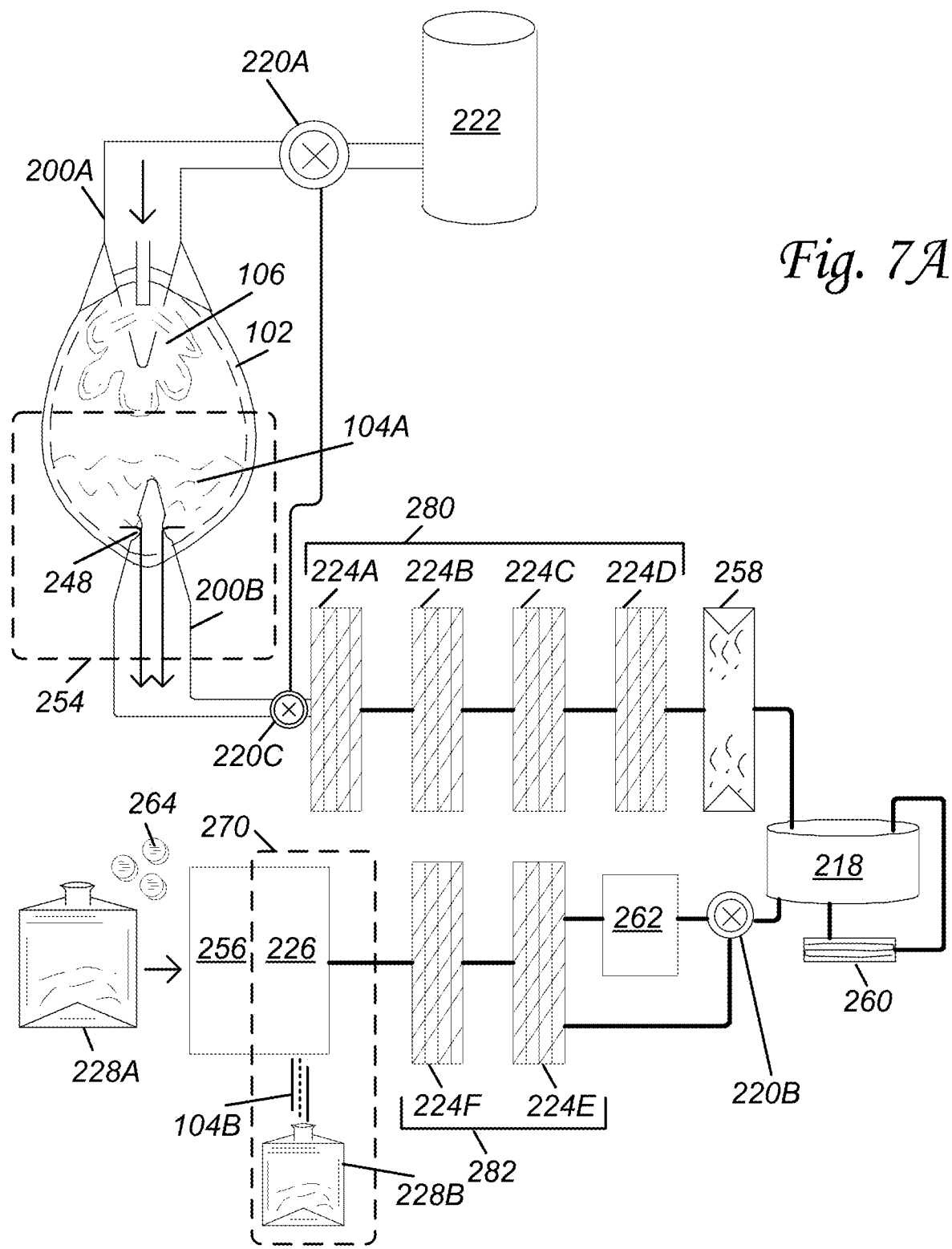
FIGS. 7A-7D illustrates examples of an oxygen free coconut water processing and packaging system.

Referring to FIG. 7A there is illustrated one example of an oxygen free coconut water processing and packaging system. An advantage in this system and method of processing and packaging coconut water is maintaining superior taste of the product all the way to the consumer and extending shelf life by not using any thermal processes to sterilize the coconut water. In this regard, heating the coconut water, like what happens in heat pasteurization destroys the sensitive flavors, nutrients, and other compounds which shorten shelf life and make for a poor tasting product by the time it reaches the consumer.

In an exemplary embodiment, coconut water can be extracted, processed, and packaged in a manner as to avoid contact with oxygen which initiates enzymatic reactions and other flavor and nutrient destroying reactions. An inert gas supply 222 comprising an inert gas 106 can be regulated through general purpose valve 220A and supplied through at least one self sealing probe 200A to the inside of a coconut 102 for the purpose of aiding the coconut water 104A egress through egress port 248, in an oxygen free manner, associated with a self sealing probe 200B. Illustrated in the FIG. 7A is the use of two self sealing probes, one configure for gas inlet the other for coconut water 104A egress. In another exemplary embodiment a single probe could be use such as illustrated in at least FIG. 1E.

The inert gas 106 can also be configured to selectively, through valve 220C control and other valves in the system, be injected into the piping, pathways, and processing equipment to purge any oxygen in the system prior to introduction of coconut water 104. This in combination with the self sealing probe 200B creates a trusted transfer environment 254 which starts at the coconut water extraction point.

In operation, the coconut water 104A is extracted and egresses through the egress port 248. The coconut water is then passed through the first cold micro-filter array 280 which further comprises a first plurality of separate membranes 224A-D, each of the first plurality of membranes can have at least one of a pore 276A-D, as illustrated in at least FIG. 7F, of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment.

The coconut water can then be transferred from the first cold micro-filter array 280 through an ultraviolet light sterilizer 258. Such ultraviolet light sterilizer can be the type manufactured by ATLANTIUM or other types or kind of ultraviolet light sterilizer, as may be required and/or desired in a particular embodiment. From the ultraviolet light sterilizer 258 the coconut water is transferred to an oxygen free collection vessel 218.

The coconut water is circulated by pump between a chiller 260 and the oxygen free collection vessel 218 further comprising circulating the coconut water 104 through an ultraviolet light sterilizer 258B prior to returning the coconut water 104 to the oxygen free collection vessel. The chiller 260 maintains the coconut water temperature at approximately 4 degrees Celsius until transfer to the filler 226 for packaging.

A general purpose valve 220B can switch the coconut water flow between a second cold micro-filter array 282 or an oxygen free cold brew processing platform 262 for cold brewing first then transferred back to the second cold micro-filter array 282 for further processing. The oxygen free cold brew processing platform 262 is better illustrated in at least FIG. 7E.

Figure 7B:
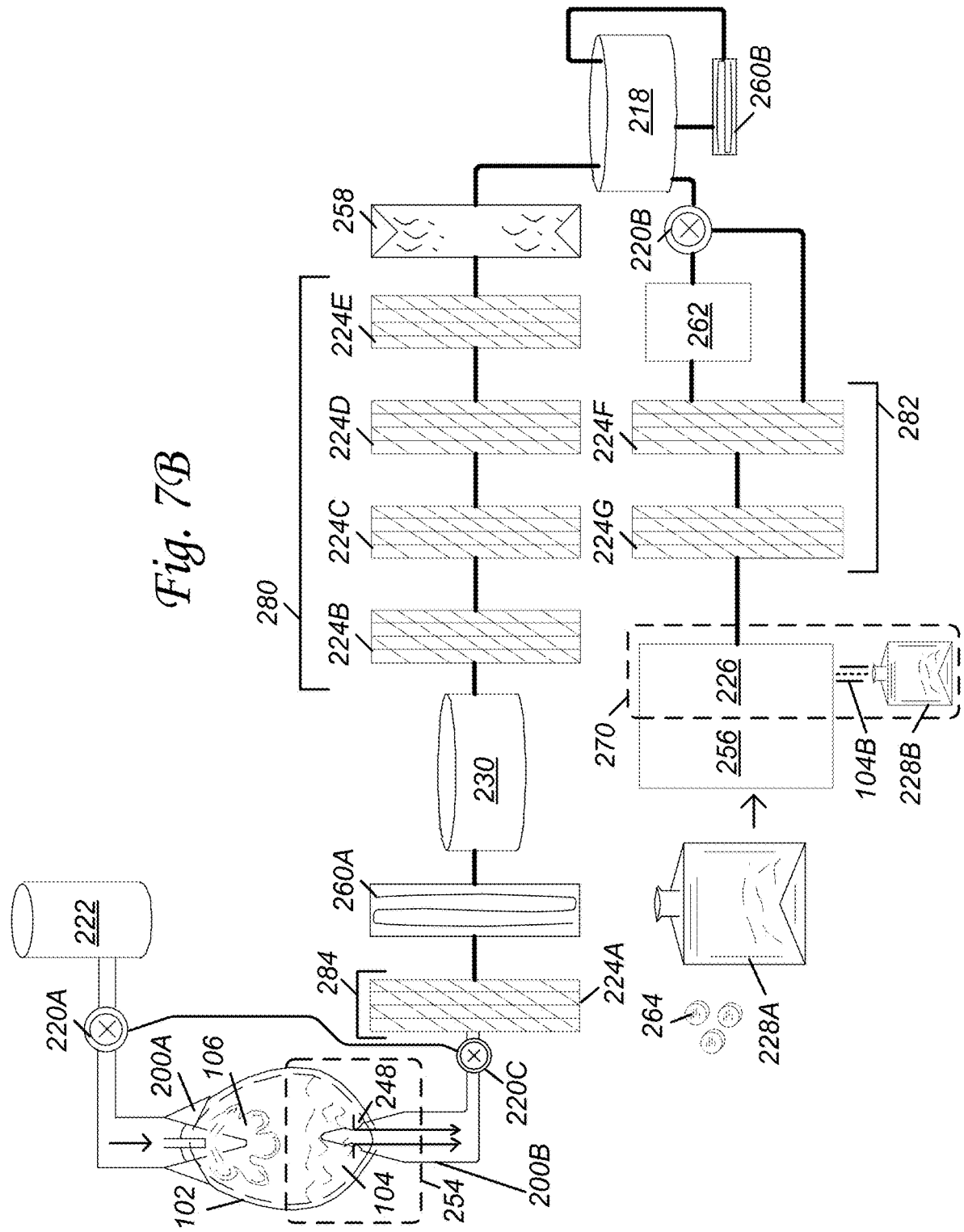
Figure 7C:
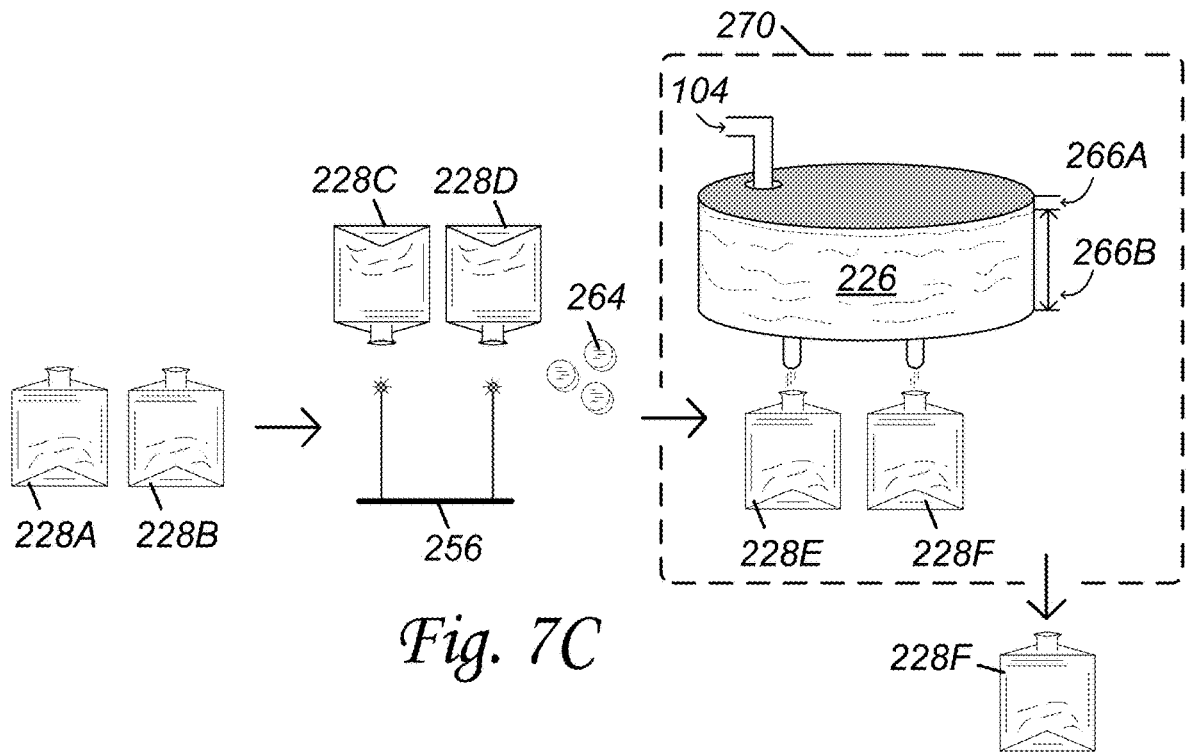
Figure 7D:
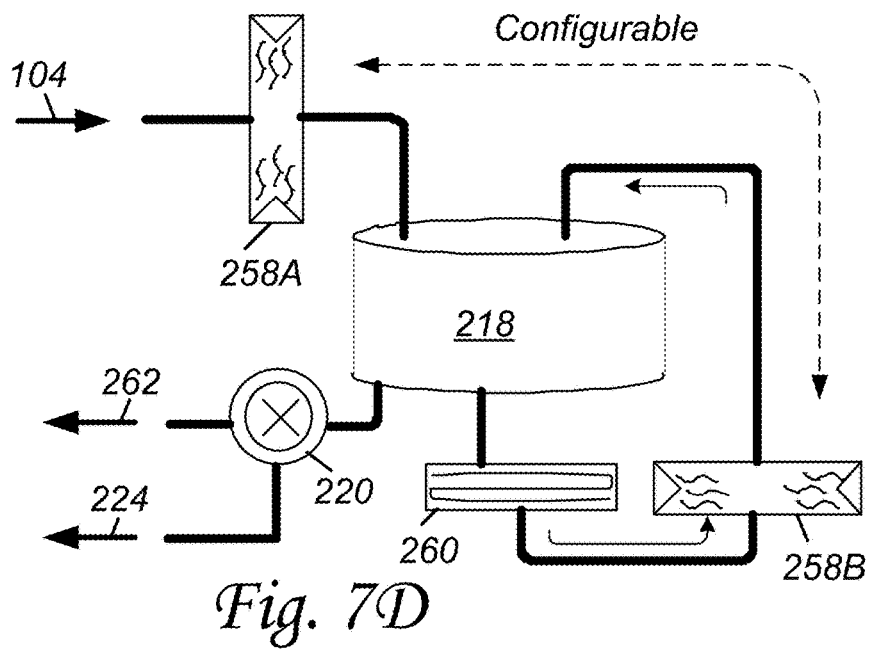
Figure 7E:
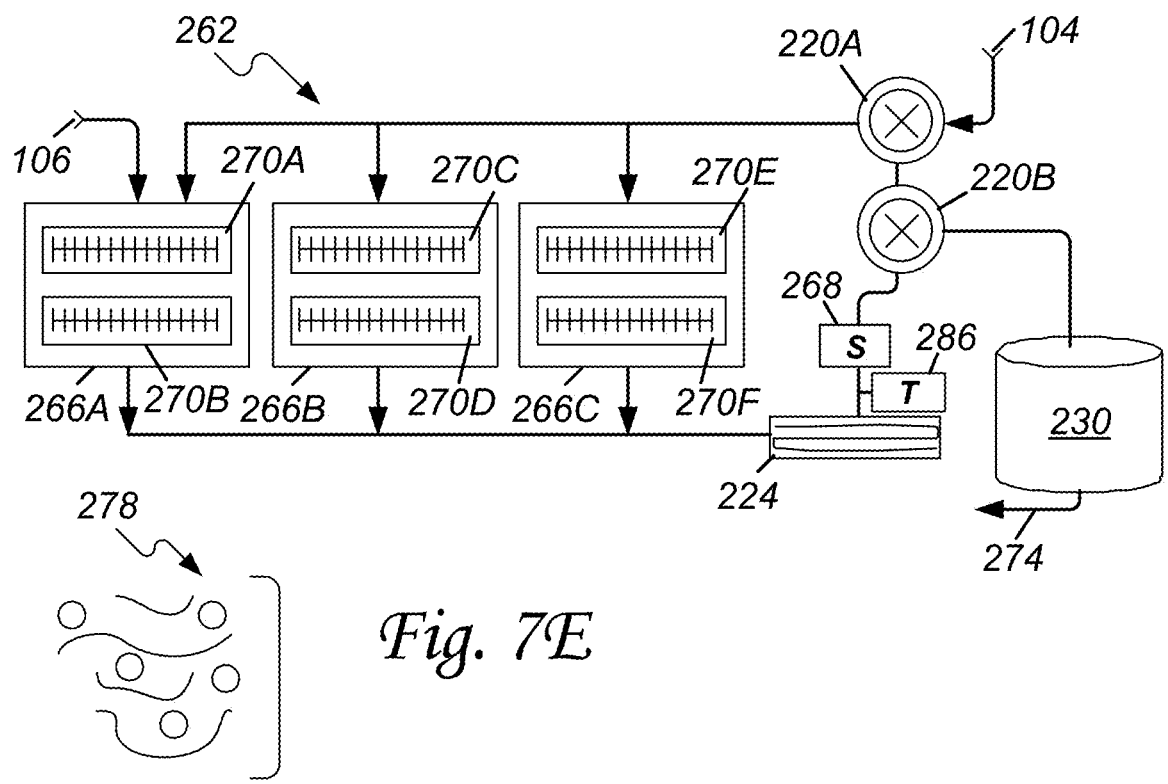
FIG. 7E illustrates one example of an oxygen free cold brew processing platform.
Figure 7F:
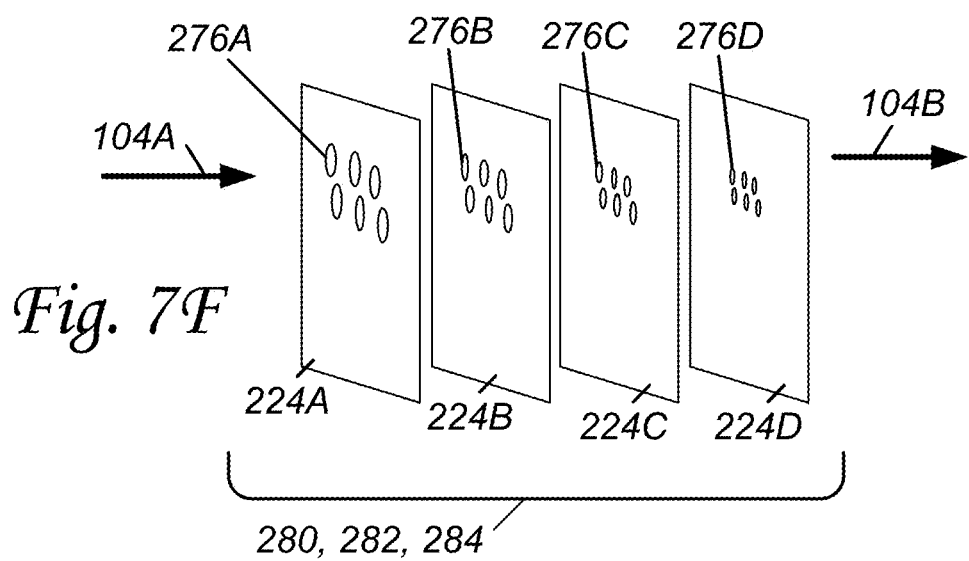
FIG. 7F illustrates one example of a cold micro-filter array.

The second cold micro-filter array 282 further comprises a second plurality of separate membranes 224E-F, each of the second plurality of membranes can have at least one of a pore 276A-D, as illustrated in at least FIG. 7F, of predetermined size through which only the coconut water particles smaller than the pore size pass. The second plurality of membranes can be arranged from largest pore size 276A at the coconut water 104A entry point to smallest pore size 276D at the coconut water 104B exit point, wherein the second plurality of separate membranes are configured in progressively smaller pore sizes 276A is greater than 276B which is greater than 276C which is greater than 276D to reduce the second plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. The coconut water is then transferred to a filler 226.

An aseptic ultra clean environment 270 is established around the filler 226. A packaged product 228A, unfilled, and a closure 264 (better illustrated in at least FIG. 7C) are sterilized by way of the package sterilizer 256. The packaged product 228A and the closure 264 into an aseptic ultra clean environment 270. Within the aseptic ultra clean environment 270, the packaged product 228B is the filled 104A by way of the filler 226 and the closure 264 affixed sealing the packaged product 228B.

Use of the term 'aseptic ultra clean environment', in the present invention, is intended to mean the filling of a sterile liquid (i.e. coconut water, and other) into a sterile product package in sterile environment conditions. In an exemplary embodiment, use of cold micro-filtration and ultraviolet light sterilizer creates a sterile coconut water product, the package sterilizer 256 creates a sterile product package, and creating an aseptic ultra clean environment 270 around the filler 226 insures a sterile environment for filling.

Referring to FIG. 7B there is illustrated one example of an oxygen free coconut water processing and packaging system. An advantage in this system and method of processing and packaging coconut water is maintaining superior taste of the product all the way to the consumer and extending shelf life by not using any thermal processes to sterilize the coconut water. In this regard, heating the coconut water, like what happens in heat pasteurization destroys the sensitive flavors, nutrients, and other compounds which shorten shelf life and make for a poor tasting product by the time it reaches the consumer.

In an exemplary embodiment, coconut water can be extracted, processed, and packaged in a manner as to avoid contact with oxygen which initiates enzymatic reactions and other flavor and nutrient destroying reactions. An inert gas supply 222 comprising an inert gas 106 can be regulated through general purpose valve 220A and supplied through at least one self sealing probe 200A to the inside of a coconut 102 for the purpose of aiding the coconut water 104A egress through egress port 248, in an oxygen free manner, associated with a self sealing probe 200B. Illustrated in the FIG. 7B is the use of two self sealing probes, one configure for gas inlet the other for coconut water 104A egress. In another exemplary embodiment a single probe could be use such as illustrated in at least FIG. 1E.

The inert gas 106 can also be configured to selectively, through valve 220C control and other valves in the system, be injected into the piping, pathways, and processing equipment to purge any oxygen in the system prior to introduction of coconut water 104. This in combination with the self sealing probe 200B creates a trusted transfer environment 254 which starts at the coconut water extraction point.

In operation, the coconut water 104A is extracted through the egress port 248 and rapidly chilled by chiller 260A. In an exemplary embodiment, as example and not a limitation, the chiller 260A chills the coconut water 104 to approximately 10 degrees Celsius. The coconut water is then transferred through a micro-filter array 284 which further comprises at least one membrane 224A, each of the membrane can have at least one of a pore 276A-D, as illustrated in at least FIG. 7F, of predetermined size through which only the coconut water particles smaller than the pore size pass. The first plurality of membranes can be arranged from largest pore size 276A at the coconut water 104A entry point to smallest pore size 276D at the coconut water 104B exit point, wherein the membrane is configured in progressively smaller pore sizes 276A is greater than 276B which is greater than 276C which is greater than 276D to reduce the membranes from clogging while also removing particulates and pathogens from the coconut water to render the coconut water sterile. There can be any number of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment. The coconut water is the transferred to an oxygen free storage vessel 230.

From the oxygen free storage vessel 230, the coconut water is then passed through the first cold micro-filter array 280 which further comprises a first plurality of separate membranes 224B-E, each of the first plurality of membranes can have at least one of a pore 276A-D, as illustrated in at least FIG. 7F, of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment.

The coconut water can then be transferred from the first cold micro-filter array 280 through an ultraviolet light sterilizer 258. Such ultraviolet light sterilizer can be the type manufactured by ATLANTIUM or other types or kind of ultraviolet light sterilizer, as may be required and/or desired in a particular embodiment. From the ultraviolet light sterilizer 258 the coconut water is transferred to an oxygen free collection vessel 218.

The coconut water is circulated by pump between a chiller 260 and the oxygen free collection vessel 218 further comprising circulating the coconut water 104 through an ultraviolet light sterilizer 258B prior to returning the coconut water 104 to the oxygen free collection vessel. The chiller 260 maintains the coconut water temperature at approximately 4 degrees Celsius until transfer to the filler for packaging.

A general purpose valve 220B can switch the coconut water flow between a second cold micro-filter array 282 or an oxygen free cold brew processing platform 262 for cold brewing and then transferred back to the second cold micro-filter array 282 for further processing. The oxygen free cold brew processing platform 262 is better illustrated in at least FIG. 7E.

The second cold micro-filter array 282 further comprises a second plurality of separate membranes 224F-G, each of the second plurality of membranes can have at least one of a pore 276A-D, as illustrated in at least FIG. 7F, of predetermined size through which only the coconut water particles smaller than the pore size pass. The first plurality of membranes can be arranged from largest pore size 276A at the coconut water 104A entry point to smallest pore size 276D at the coconut water 104B exit point, wherein the second plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment. The coco nut water is then transferred to a filler 226.

An aseptic ultra clean environment 270 is established around the filler 226. A packaged product 228A, unfilled, and a closure 264 (better illustrated in at least FIG. 7C) are sterilized by way of the package sterilizer 256. The packaged product 228A and the closure 264 into an aseptic ultra clean environment 270. Within the aseptic ultra clean environment 270, the packaged product 228B is the filled 104A by way of the filler 226 and the closure 264 affixed sealing the packaged product 228B.

Referring to FIG. 7C there is illustrated an oxygen free coconut water processing and packaging system. In an exemplary embodiment, the transfer of the coconut water to the package product has to be accomplished without introducing contaminates or oxygen. An advantage in the present invention is the combination use of a package and closure sterilizer, an aseptic ultra clean environment 270 created around the filler 226, and the maintaining of a minimal head space 266A in the filler to avoid ingress of oxygen into the filler at the fill valves during filling.

In operation, product packages 228A and 228B can be inverted as 228C and 228D and sterilized by way of sterilizer 256. Sterilization can be by way of a cleaning solution or other methods, as may be required and or desired in a particular embodiment. The closures 264 are also sterilized.

An aseptic ultra clean environment 270 created around the filler 226. Such can be created by encasing the filler 226 and providing a high level of air filtering to remove and create an environment free of pathogens. The sterilized product packages illustrated as 228E and 228F can then be introduced into the aseptic ultra clean environment 270.

Coconut water 104 if continually fed into the filler 226 so that if remains filled (shown as 226B). This is a strategy to keep the head space 266A purposefully at a minimal level to avoid introduction of oxygen into the filler at the fill valve during the time the coconut water is filled into the product package.

The product packages 228E and 228F are filled by filler 226 and the closures applied to seal the package within the aseptic ultra clean environment 270. The product package 228F then exits the system.

Referring to FIG. 7D there is illustrated an oxygen free coconut water processing and packaging system. In an exemplary, an ultraviolet light sterilizer can be configured is several ways to aid in the sterilization of the coconut water.

In a first way as illustrated in at least FIGS. 7A and 7B a single ultraviolet light sterilizer 258A can be used as the coconut water 104 is transferred to the oxygen free collection vessel 218.

A second way is to place an ultraviolet light sterilizer 258B in the circulation loop. In this regard, the step of circulating the coconut water between the chiller 260 and the oxygen free collection vessel 218 can further comprise circulating the coconut water through the ultraviolet light sterilizer 258B prior to returning the coconut water to the oxygen free collection vessel. An advantage of this method is the coconut water is continuously being sterilized while being held in the oxygen free collection vessel 218 for either transfer to an oxygen free cold brew processing platform 262 or for transfer to the second cold micro-filter array 224 (illustrated in at least FIGS. 7A and 7B).

A third way is to use both ultraviolet light sterilizer 258A and 258B in the processing system.

Referring to FIG. 7E illustrates one example of an oxygen free cold brew processing platform. An advantage of the oxygen free cold brew processing platform is that under cold brew conditions of the present invention, including lower temperatures in an oxygen free environment, brew time is reduced by about 75% and superior taste is maintained versus ambient or heated brew temperature brew conditions which destroy flavor, nutrients, and other compounds.

In an exemplary embodiment, the coconut water 104 can be diverted to an oxygen free cold brewing platform and infused with a brew ingredient 278 such as coffee, tea, floras, spices, fruit/vegetable, combinations thereof and/or other brew ingredient. Such flora and spices can include, for example and not a limitation, rosemary, cardamom, ginger, and mint. Fruit infusion can include, for example and not a limitation, orange, lemon, lime, berry (i.e. strawberry, blueberry, other), and other. Vegetable infusion can include, for example and not a limitation, cucumber, bottle gourd, and other. Once the cold brewing is complete the brewed coconut water product is returned for product packaging. The cold brewing process happens in the presence of the inert gas 106 making the brewing process oxygen free.

In operation, the oxygen free cold brew processing platform is injected with the inert gas 106 purging oxygen from the system and creating a trusted transfer environment. This step typically happens when the whole oxygen free coconut water processing and packaging system is injected with the inert gas 106 purging the oxygen and creating a trusted transfer environment.

Continuing, a brew ingredient 278 such as coffee, tea, or other brew ingredient is placed into a plurality of brew ingredient baskets 270A-F. A plurality of sealable brew tanks 266A-C are operationally related to a chiller 224, a brew density sensor 268, and a plurality of general purpose valves 220A and 220B. Each of the plurality of sealable brew tanks 266A-C further comprising at least one of the plurality of brew ingredient baskets illustrated as 270A-F. Such a brew density sensor 268 can be a total dissolved solids (TDS) sensor manufactured by HM DIGITAL and/or other type, kinds, or manufacturers as may be required and/or desired in a particular embodiment.

In an exemplary embodiment, a temperature sensor 286 is operationally related to the chiller 224. In this regard, the temperature of the coconut water during brewing is maintained optimally between 2 degrees and 4 degrees Celsius, an advantage in the present invention being brewing at the lowest possible temperature improves taste quality of the final beverage product. It also helps minimize microbial growth. Such a temperature sensor 286 can be manufactured by PYROMATION and/or other types, kinds, or manufacturers as may be required and/or desired in a particular embodiment.

The coconut water 104 is received into the plurality of sealable brew tanks 266A-C and circulated by pump between the plurality of sealable brew tanks 266A-C, through the brew ingredient 278, the chiller 224, and the brew density sensor 268 to infuse the coconut water with the brew ingredients 278.

The coconut water is transferred to an oxygen free brew complete storage tank 230 when the brew density sensor 268 indicates a predetermined brew density has been achieved. The brew density sensor 268 can be a total dissolved solids (TDS) sensor or other type or kind of sensor, as may be required and/or desired in a particular embodiment. When desired the infused coconut water can be transferred from the brew complete storage tank 230 back to the second cold micro-filter array 282.

Referring to FIG. 7F illustrates one example of a cold micro-filter array. In an exemplary embodiment, in operation, the coconut water 104 is passed through at least one of a cold micro-filter array illustrated in the various Figures as 280, 282, or 284. The cold micro-filter array further comprises a plurality of separate membranes 224A-D, each of the plurality of membranes can have at least one of a pore 276A-D of predetermined size through which only the coconut water particles smaller than the pore size pass. The plurality of membranes can be arranged from largest pore size 276A at the coconut water 104A entry point to smallest pore size 276D at the coconut water 104B exit point, wherein the plurality of separate membranes are configured in progressively smaller pore sizes 276A is greater than 276B which is greater than 276C which is greater than 276D to reduce the plurality of membranes from clogging while also removing particulates and pathogens from the coconut water to render the coconut water sterile. There can be any number of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment.

Figure 8:
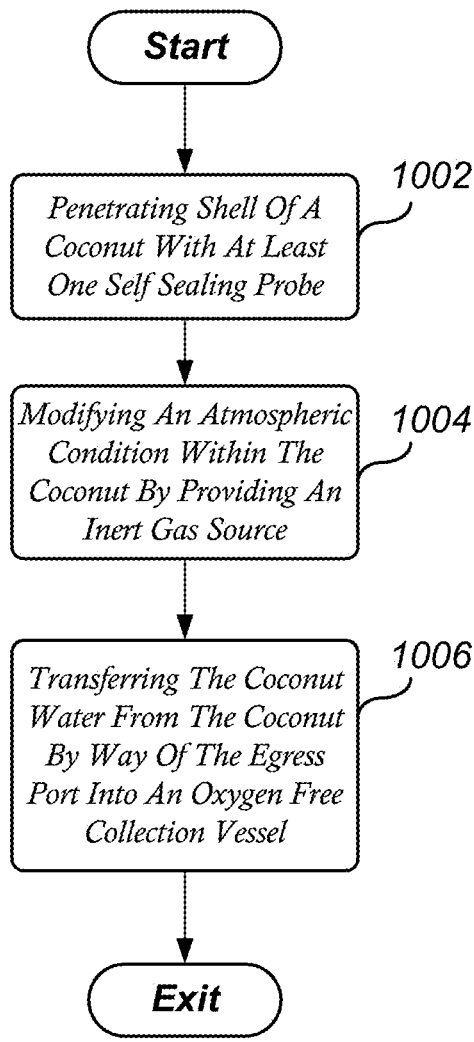
FIGS. 8, 9, and 10A-10C illustrate examples of a method of preventing oxygen from contacting the coconut water during extraction from a coconut.

Referring to FIG. 8 there is illustrated one example of a method of preventing oxygen from contacting the coconut water during extraction from a coconut. In an exemplary embodiment, the shell of a coconut 102 can be penetrated by at least one of a self sealing probe 200. An atmospheric condition can then be modified within the coconut by providing an inert gas 106 by way of an inert gas source 222. The atmospheric condition selected causes the coconut water 104 inside the coconut 102 to transfer through an egress port 248 to an oxygen free collection vessel 218. The method begins in block 1002.

In block 1002, the shell of a coconut is penetrated with at least one of a self sealing probe 200, the self sealing probe 200 forming a seal between the shell of the coconut 102 and the outer surface of the self sealing probe 200 preventing non-inert gases, such as oxygen, from ingress into the coconut 102 contacting a coconut water 104 therein and preventing the coconut water 104 from egress along the outer surface of the self sealing probe 200. The self sealing probe 200 further comprising at least one of an egress port 248. In an exemplary embodiment, a mechanical force or other suitable force can be applied to the coconut 102 or to the self sealing probe 200 to cause the self sealing probe 200 to penetrate the coconut 102. The method move to block 1004.

In block 1004, an atmospheric condition is modified within the coconut by providing an inert gas 106 by way of an inert gas source 222 at a desired atmospheric pressure through a gas inlet 206 into the coconut 102, the atmospheric condition being selected to engender flow of the coconut water 104 through the egress port 248. In an exemplary embodiment, the atmospheric condition can be creating a positive inert gas 106 pressure to force the coconut water 104 out of the coconut 102 by way of egress port 248.

In an alternative exemplary embodiment, the atmospheric condition could be nominal or ambient pressure providing a source of inert gas 102 such that a negative or vacuum pressure elsewhere in the system causes the coconut water 104 to be sucked or drawn out of the coconut 102 through the egress port 248. The inert gas at nominal pressure or ambient pressure preventing a vacuum from occurring within the coconut 102 and allowing the coconut water 104 to exit the coconut 102. The method continues in block 1006.

In block 1006, the coconut water is transferred from the coconut 102 by way of the egress port 248 traversing the interior of the self sealing probe 200 into an oxygen free collection vessel 218. The method is then exited.

Figure 9:
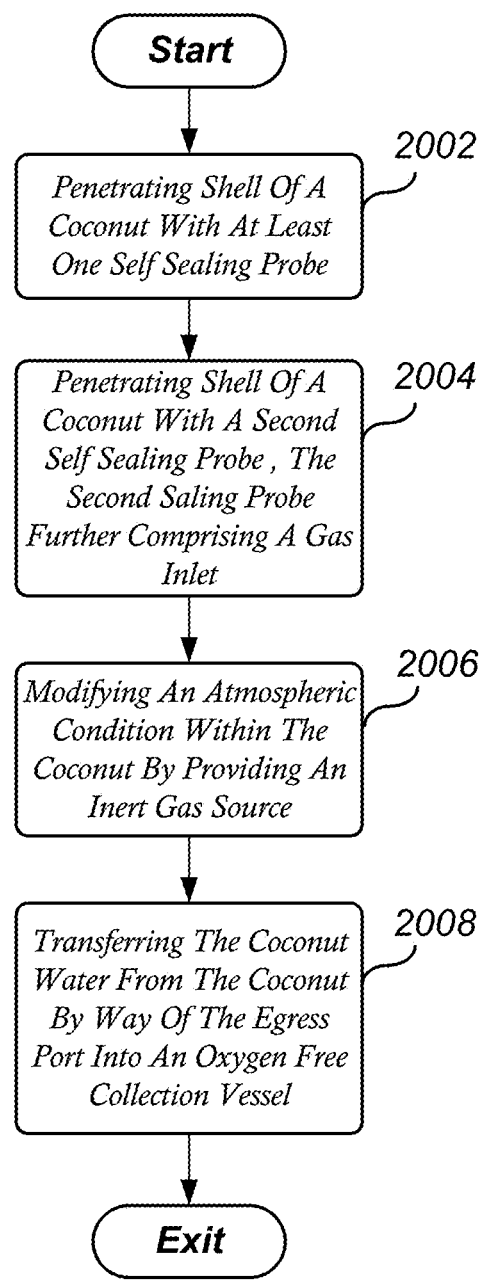

Referring to FIG. 9 there is illustrated one example of a method of preventing oxygen from contacting the coconut water during extraction from a coconut. In an exemplary embodiment and with reference to at least FIG. 3, the shell of a coconut 102 can be penetrated by at least one of a self sealing probe 200B. The shell of the coconut 102 can also be penetrated by a second self sealing probe 200A. The second self sealing probe 200A further comprises a gas inlet 206. An atmospheric condition can then be modified within the coconut 102 by providing an inert gas 106 by way of an inert gas source 222. The atmospheric condition, selected causes the coconut water 104 inside the coconut 102 to transfer through an egress port 248 to an oxygen free collection vessel 218. The method begins in block 2002.

In block 2002, the shell of a coconut 102 can be penetrated with at least one of a self sealing probe 200B, the self sealing probe 200B forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe 200, the self sealing probe 200 further comprising an egress port 248. In an exemplary embodiment, a mechanical force or other suitable force can be applied to the coconut 102 or to the self sealing probe to cause the self sealing probe 200 to penetrate the coconut 102. The method moves to block 2004.

In block 2004, the shell of the coconut 102 can be penetrated with a second self sealing probe, the second self sealing probe further comprising a gas inlet 206. In an exemplary embodiment, a mechanical force or other suitable force can be applied to the coconut 102 or to the second self sealing probe to cause the second self sealing probe 200 to penetrate the coconut 102. The method moves to block 2006.

In block 2006, an atmospheric condition within the coconut 102 can be modified by providing an inert gas 106 by way of an inert gas source 222 at desired atmospheric pressure through the gas inlet 206, the atmospheric condition being selected to engender flow of the coconut water 104 through the egress port 248. In an exemplary embodiment, the atmospheric condition can be creating a positive inert gas 106 pressure to force the coconut water 104 out of the coconut 102 through the egress port 248.

In an alternative exemplary embodiment, the atmospheric condition could be nominal or ambient pressure providing a source of inert gas 106 such that a negative or vacuum pressure elsewhere in the system causes the coconut water 104 to be sucked or drawn out of the coconut 102 through the egress port 248. The inert gas at nominal pressure or ambient pressure preventing a vacuum from occurring within the coconut 102 and allowing the coconut water 104 to exit the coconut 102 through the egress port 248. The method continues in block 2008.

In block 2008, the coconut water 104 is transferred from the coconut 102 by way of the egress port 248 traversing the interior of the self sealing probe 200 into an oxygen free collection vessel 218. The method is then exited.

Figure 10A:
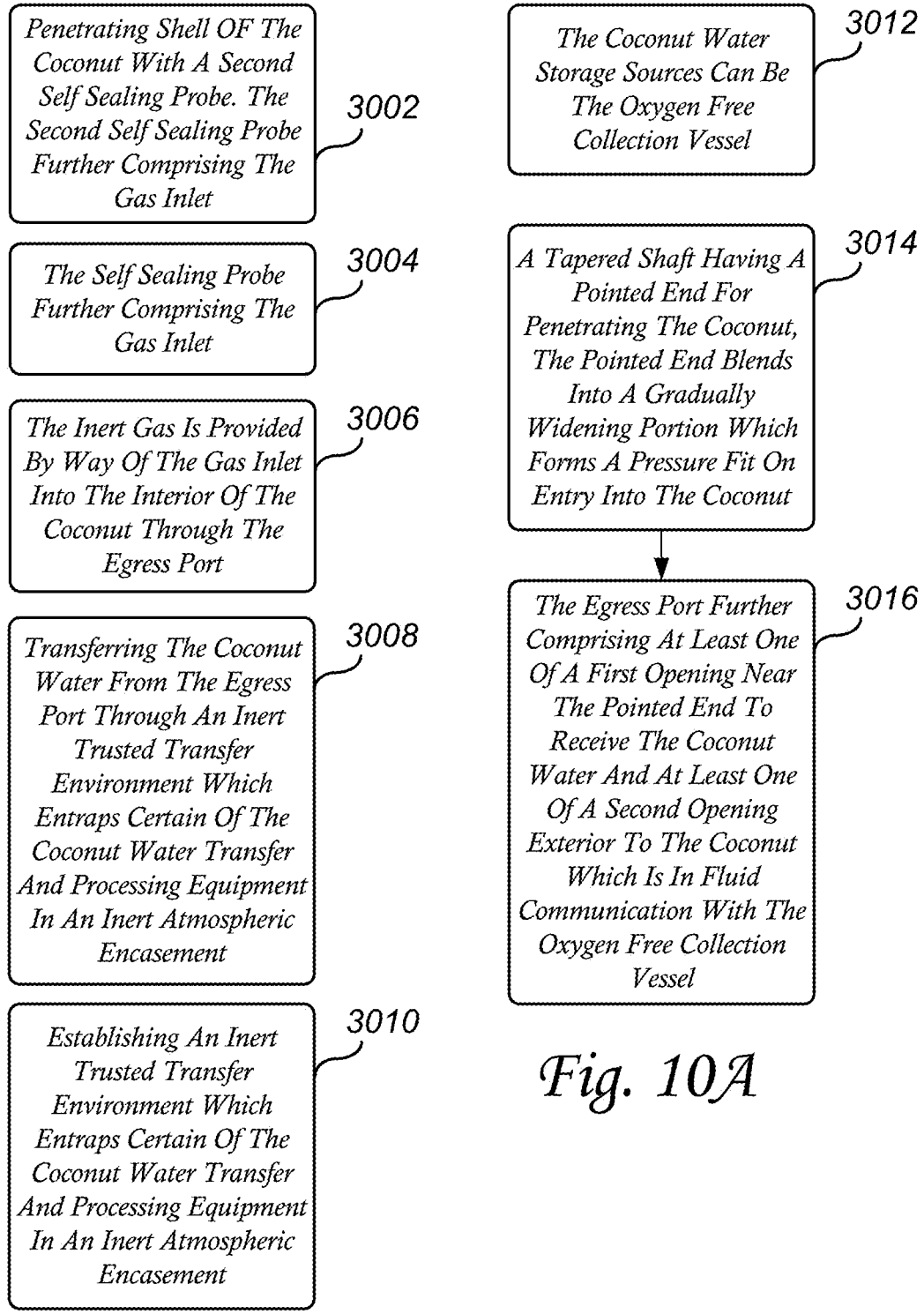

Referring to FIG. 10A there is illustrated exemplary embodiments of a method of preventing oxygen from contacting the coconut water 104 during extraction from a coconut 102. Such exemplary embodiments can be interchangeably used with the methods of the present invention.

In block 3002, in an exemplary embodiment, the shell of the coconut 102 can be penetrated with a second self sealing probe, the second self sealing probe further comprising the gas inlet 206.

In block 3004, in an exemplary embodiment, the self sealing probe further comprising the gas inlet 206.

In block 3006, in an exemplary embodiment, the inert gas 106 is provided by way of the gas inlet 206 into the interior of the coconut 102 through the egress port 248.

In block 3008, in an exemplary embodiment, the coconut water 104 is transferred from the egress port 248 through an inert trusted transfer environment 254 which entraps certain of the coconut water transfer and processing equipment in an inert atmospheric encasement, preventing non-inert gas, such as oxygen, from making contact with the coconut water 104 during transport to the oxygen free collection vessel 218.

In block 3010, an inert trusted transfer environment 254 is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas from making contact with the coconut water 104 during transfer and processing from a coconut water storage source 218 to a packaged product 228. The packaged product 228 containing at least portion of the coconut water 104.

In block 3012, the coconut water storage sources can be the oxygen free collection vessel 218. For disclosure purposes the coconut water storage sources and the oxygen free collection vessel can be the same and are labeled 218.

In block 3014 and with reference to at least FIG. 1A, the self sealing probe 200 can further comprises a tapered shaft having a pointed end 212 for penetrating the coconut 102, the pointed end blends into a gradually widening portion 214 which forms a pressure fit on entry into the coconut 102 between the outer surface of the gradually widening portion 214 and the shell of the coconut 102. The method then moves to block 3016.

In block 3016 and with reference to at least FIG. 1A, the egress port 248 further comprises at least one of a first opening 204A near the pointed end 212 to receive the coconut water 104 and at least one of a second opening 238 exterior to the coconut which is in fluid communication with the oxygen free collection vessel 218.

Figure 10B:
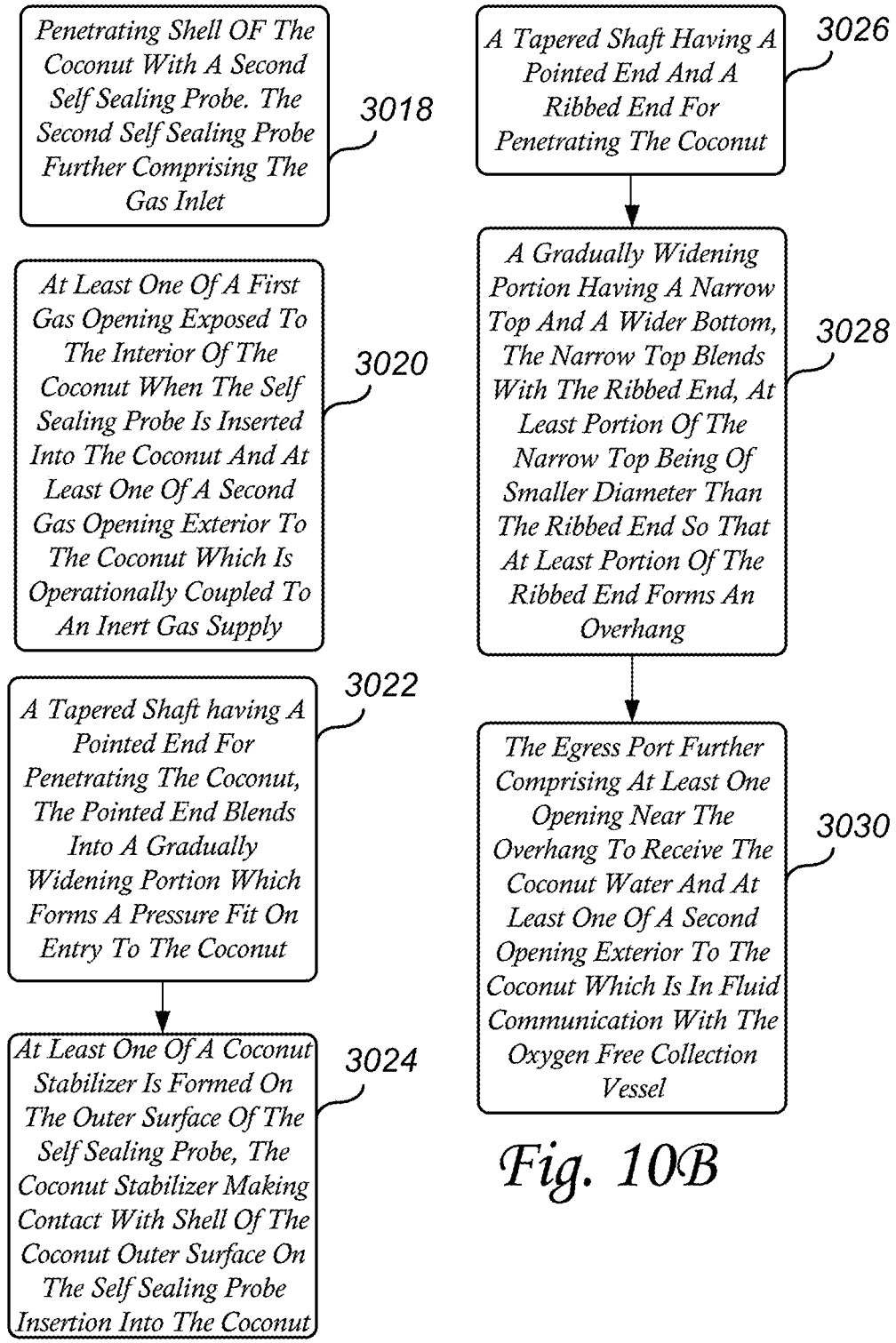

Referring to FIG. 10B there is illustrated exemplary embodiments of a method of preventing oxygen from contacting the coconut water 104 during extraction from a coconut 102. Such exemplary embodiments can be interchangeably used with the methods of the present invention.

In block 3018, the shell of a coconut is penetrated with at least one of a self sealing probe 200, the self sealing probe 200 forming a seal between the shell of the coconut 102 and the outer surface of the self sealing probe 200 preventing non-inert gases from ingress into the coconut 102 contacting a coconut water 104 therein and preventing the coconut water 104 from egress along the outer surface of the self sealing probe 200, the self sealing probe 200 further comprising at least one of an egress port 248. In an exemplary embodiment, a mechanical force or other suitable force can be applied to the coconut 102 or to the self sealing probe to cause the self sealing probe 200 to penetrate the coconut 102.

In block 3020 with reference to at least FIGS. 1D and 1E, at least one of a first gas opening 250 is exposed to the interior of the coconut when the self sealing probe 200 is inserted into the coconut 102 and at least one of a second gas opening 252 exterior to the coconut 102 which is operationally coupled to an inert gas supply 222.

In block 3022 and with reference to at least FIG. 1D, a tapered shaft 202 having a pointed end 212 for penetrating the coconut 102, the pointed end 212 blends into a gradually widening portion 214 which forms a pressure fit on entry into the coconut 102 between outer surface of the gradually widening portion 214 and the shell of the coconut 102. The method moves to block 3024.

In block 3024 and with reference to at least FIG. 1D, at least one of a coconut stabilizer 216 (216A and 216B in at least FIG. 1D) is formed on the outer surface of the self sealing probe 200. The coconut stabilizer 216 making contact with the shell of the coconut 102 outer surface when the self sealing probe 200 is inserted into the coconut 102, wherein the coconut stabilizer 216 mitigates the coconut 102 movement and improves the integrity of the seal between shell of the coconut 120 and the outer surface of the self sealing probe 200 during extraction of the coconut water 104.

In block 3026 with reference to at least FIG. 1B, a tapered shaft 202 having a pointed end 212 and a ribbed end 244 for penetrating the coconut 102. The method moves to block 3028.

In block 3028 with reference to at least FIG. 1B, a gradually widening portion 214 having a narrow top and a wider bottom, the narrow top blends with the ribbed end 242, at least portion of the narrow top being of smaller diameter than the ribbed end 242 so that at least portion of the ribbed end 242 forms an overhang 244, the wider bottom is larger in diameter than the ribbed end 242, the gradually widening portion forms a pressure fit on entry into the coconut 102 between outer surface of the gradually widening portion 214 and shell of the coconut 102. The method continues in block 3030.

In block 3030 with reference to at least FIG. 1B, the egress port 248 further comprises at least one of a first opening 204A near the overhang 244 to receive the coconut water 104 and at least one of a second opening 238 exterior to the coconut 102 which is in fluid communication with the oxygen free collection vessel 218, the overhang 244 minimizing material from the shell of the coconut 102 from clogging the first opening 204A during insertion of the self sealing probe 200 into the coconut 102.

Figures 10C, 11:
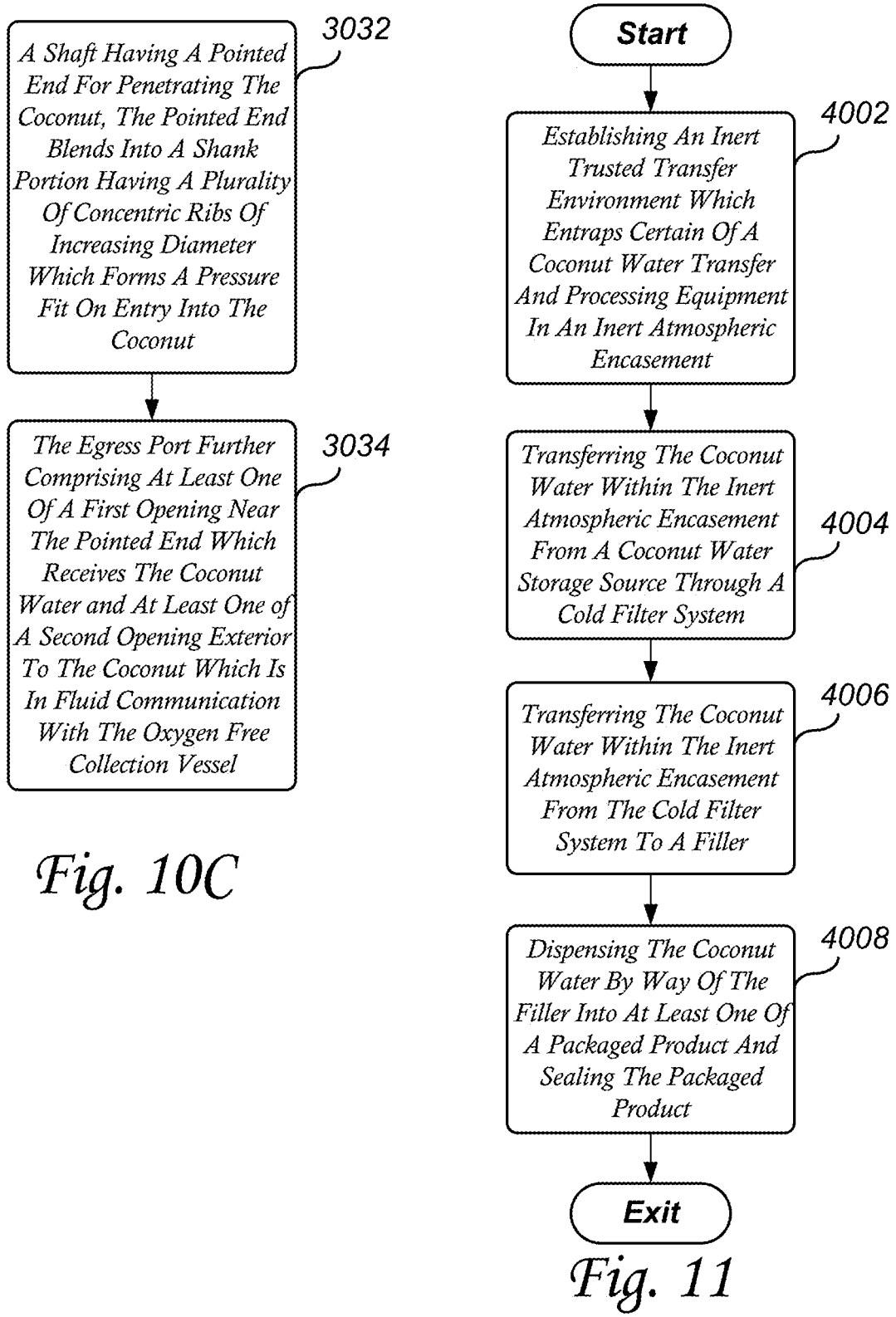
FIGS. 11-14 illustrate examples of a method of preventing oxygen from contacting coconut water during processing and packaging of the coconut water.

Referring to FIG. 10C there is illustrated exemplary embodiments of a method of preventing oxygen from contacting the coconut water 104 during extraction from a coconut 102. Such exemplary embodiments can be interchangeably used with the methods of the present invention.

In block 3032 and with reference to at least FIG. 1C, the self sealing probe 200 further comprises a shaft 246 having a pointed end 212 for penetrating the coconut 102, the pointed end 212 blends into a plurality of concentric ribs 208 of increasing diameter which forms a pressure fit on entry into the coconut 102 between the outer surface of the plurality of concentric ribs 208 and the shell of the coconut 102. The method continues in block 3034.

In block 3034 and with reference to at least FIG. 1C, the egress port 248 further comprising at least one of a first opening 204A near the pointed end 212 which receives the coconut water 104 and at least one of a second opening 238 exterior to the coconut 102 which is in fluid communication with the oxygen free collection vessel 218.

Referring to FIG. 11 there is illustrated one example of a method of preventing oxygen from contacting coconut water 104 during processing and packaging of the coconut water 104. In an exemplary embodiment, an inert trusted environment 254 created with inert gas 106 is established around at least one of the transfer and processing equipment. At least a portion of the coconut water 104 is then transferred, within the inert trusted environment 254, from an oxygen free storage source 218 through a filtering system 224, through a filler 226, and then dispensed from the filler 226 into packaging 228.

Such an inert trusted transfer environment 254 can be created by wrapping a piece of equipment and injecting the inert gas 106 between the equipment and wrap layer. It can also be created by placing equipment in an enclosed area and injecting the inert gas 106 into the closed area displacing oxygen that is present. It can also be created by dosing package 228 and other vessels to displace the oxygen inside, replacing with the inert gas 106 creating an inert trusted transfer environment within the package 228. At least FIGS. 5 and 6 illustrate this by placing a boundary around the equipment and showing an inert gas 106 environment around the equipment. The method begins in block 4002.

In block 4002, an inert trusted transfer environment is established which entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas from making contact with the coconut water 104 during transfer and processing from a coconut water storage source 218 to a packaged product 228. The product package 228 containing at least a portion of the coconut water. The method moves to block 4004.

In block 4004, the coconut water 104 is transferred, within the inert atmospheric encasement created by inert gas 106, from a coconut water storage source 218 though a cold filter system 224, wherein the cold filter system makes the coconut water sterile and safe for human consumption. The method moves to block 4006.

In block 4006, the coconut water 104 is transferred, within the inert atmospheric encasement created by inert gas 106, from the cold filter system 224 to a filler 226. The method moves to block 4008.

In block 4008, the coconut water is dispensed by way of the filler 226, within the inert atmospheric encasement, into at least one of a packaged product 228 and sealing the packaged product 228, wherein the coconut water is prevented from contacting non-inert gas during transfer and processing from the coconut water storage source 218 to the packaged product 228. The packaged product 228 containing at least a portion of the coconut water 104. The method is then exited.

Figure 12:
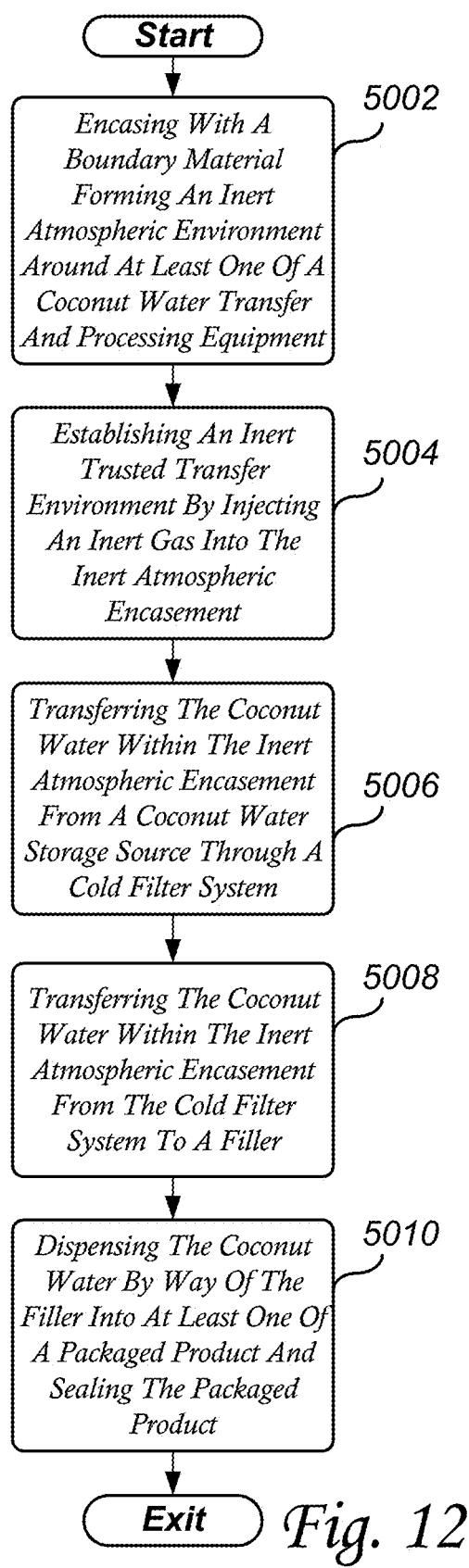

Referring to FIG. 12 there is illustrated one example of a method of preventing oxygen from contacting coconut water 104 during processing and packaging of the coconut water 104. In an exemplary embodiment, at least one piece of coconut water transfer and processing can be encased with a boundary material. Once encased inert gas can be injected to create an inert trusted transfer environment. The coconut water can then be transferred through the transfer and processing equipment, certain of which are, within the inert trusted transfer environment 254, and dispensed into a package 228.

Such boundary material can include for example and not a limitation, tapes and wraps, glass, plastic, other panel enclosure materials, and other boundary materials, as may be required and/or desired in a particular embodiment. The method begins in block 5002.

In block 5002, a boundary material encases and forms an inert atmospheric environment around at least one of a coconut water transfer and processing equipment. The method moves to block 5004.

In block 5004, an inert trusted transfer environment 254 is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106. The non-inert gas is prevented from making contact with the coconut water 104 during transfer and processing from a coconut water oxygen free storage source 218 to a packaged product 228 containing at least portion of the coconut water. The method moves to block 5006.

In block 5006, the coconut water 104 is transferred, within the inert atmospheric encasement created by inert gas 106, from a coconut water storage source 218 though a cold filter system 224, wherein the cold filter system making the coconut water sterile and safe for human consumption. The method moves to block 5008.

In block 5008, the coconut water 104 is transferred, within the inert atmospheric encasement created by inert gas 106, from the cold filter system 224 to a filler 226. The method moves to block 5010.

In block 5010, the coconut water is dispensed by way of the filler 226, within the inert atmospheric encasement, into at least one of a packaged product 228 and sealing the packaged product 228, wherein the coconut water is prevented from contacting non-inert gas during transfer and processing from the coconut water storage source 218 to the packaged product 228. The packaged product 228 containing at least a portion of the coconut water 104. The method is then exited.

Figure 13:
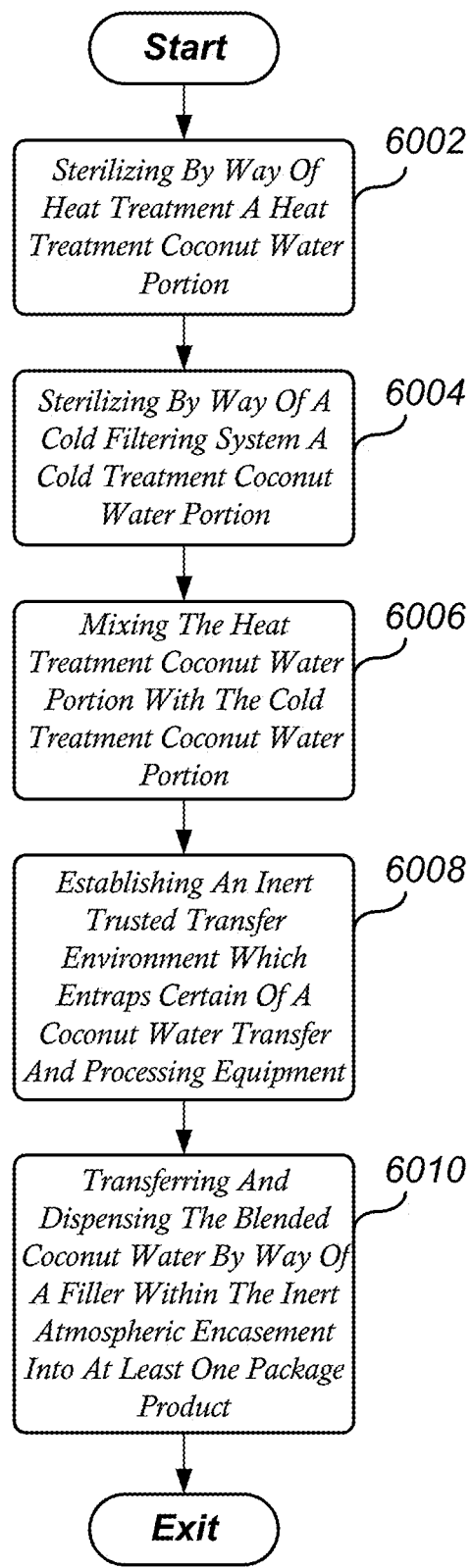

Referring to FIG. 13 there is illustrated one example of a method of preventing oxygen from contacting coconut water 104 during processing and packaging of the coconut water 104. In an exemplary embodiment, a heat treatment coconut water 104 portion can be sterilized by way of heat treatment 230. The heat treatment coconut water 104 portion can then be mixed with the coconut water processed by way of the cold filter system 224. In this regard, a plurality of desirable organic compounds that were removed from the coconut water 104 when passed through the cold filter system 224 is restored to the coconut water 104 by way of the (unfiltered) heat treatment sterile coconut water portion. In an exemplary embodiment, the plurality of useful compounds can include amino acids, nutrients, and other useful organic compounds.

To elaborate, microfiltration by way of filtration system 224 can stripe everything larger than the filter pore size, as example in the range of 0.1 microns. While making the coconut water 104 sterile by removing the biological pathogens, the small pore size can also remove some of the useful organic compounds from the coconut water. To restore the useful compounds a portion of coconut water 104 is heat treated to sterilize by way of heat treatment system 230. Additional post process 232 can be used as necessary such as cooling or temporarily storing the heat treated portion or other post process, as may be required and/or desired in a particular embodiment. The method begins in block 6002.

In block 6002, by way of heat treatment a heat treatment coconut water portion which comprises a plurality of desirable organic compounds can be sterilized. The method moves to block 6004.

In block 6004, by way of a cold filtering system a cold treatment coconut water portion can be sterilized. Such filtering also removes a plurality of desirable organic compounds from the coconut water. The method moves to block 6006.

In block 6006, the heat treatment coconut water portion is mixed with the cold treatment coconut water portion forming a blended coconut water which comprises the plurality of desirable organic compounds. The method moves to block 6008.

In block 6008, an inert trusted transfer environment is established which encases and entraps certain of the coconut water transfer and processing equipment (as example and not a limitation at least one of but not limited to 200, 218, 224, 226, 230, 232, 234, 236 package 228) in an inert atmospheric encasement created by inert gas 106, preventing non-inert gas contact with the coconut water 104 during transfer and processing from a coconut water storage source 218 to a packaged product 228 containing at least portion of the coconut water. The method moves to block 6010.

In block 6010, the blended coconut water is transferred and dispensed by way of a filler 226, within the inert atmospheric encasement created by inert gas 106, into at least one of a packaged product 228, wherein the blended coconut water is prevented from contacting non-inert gas during transfer, processing, packaging, the packaged product, the packaged product containing at least portion of the blended coconut water.

Figure 14:
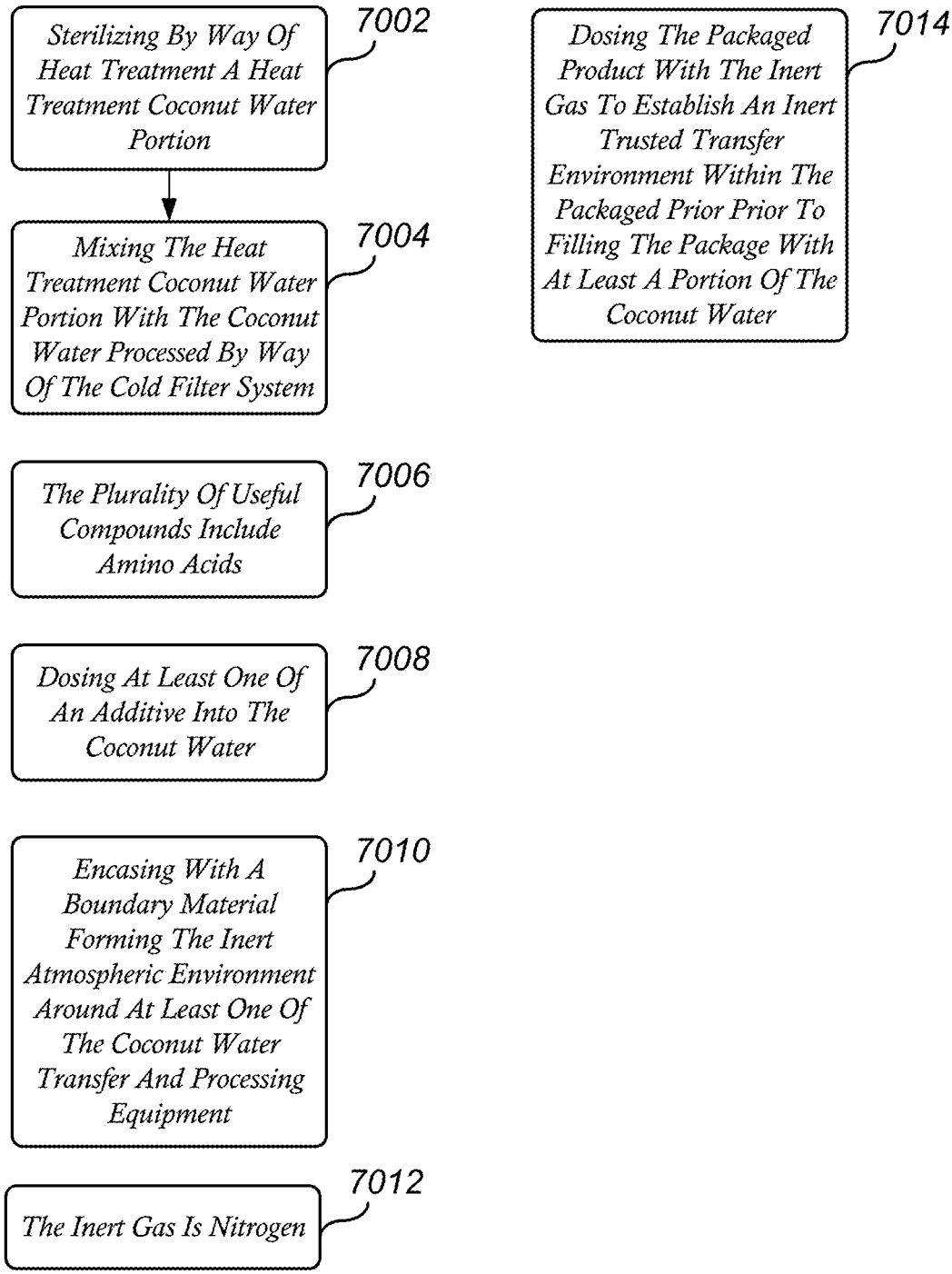

Referring to FIG. 14 there are illustrated exemplary embodiments of a method of preventing oxygen from contacting coconut water 104 during processing and packaging of the coconut water 104. Such exemplary embodiments can be interchangeably used with the methods of the present invention.

In block 7002, by way of a cold filtering system a cold treatment coconut water portion can be sterilized. Such filtering also removes a plurality of desirable organic compounds from the coconut water. The method moves to block 7004.

In block 7004, the heat treatment coconut water portion is mixed with the cold treatment coconut water portion forming a blended coconut water which comprises the plurality of desirable organic compounds.

In block 7006, in an exemplary embodiment, the plurality of useful compounds can include amino acids.

In block 7008, in another exemplary embodiment, at least one of an additive can be dosed by way of doser 236 into the coconut water 104. In this regard, flavor, color, nutrients, nutraceuticals, and other additives, as may be required and/or desired can be dosed into the coconut water 104.

In block 7010, a boundary material encases and forms an inert atmospheric environment around at least one of the coconut water transfer and processing equipment.

In block 7012, the inert gas can be nitrogen.

In block 7014, the packaged product can be dosed with the inert gas to establish an inert trusted transfer environment within the packaged product 228 prior to filling the packaged product 228 with at least a portion of the coconut water 104. In an exemplary embodiment and with reference to at least FIGS. 5 and 6, the product package 28 can be dosed with the inert gas 106 prior to filling so that any oxygen present in the product package 228 is displaced exiting the product package 228 before filling. In this regard, avoiding ingress of oxygen into the coconut water 104 and/or the transfer and processing equipment during transfer, processing, and filling including filling by way of filler 226.

Figure 15:
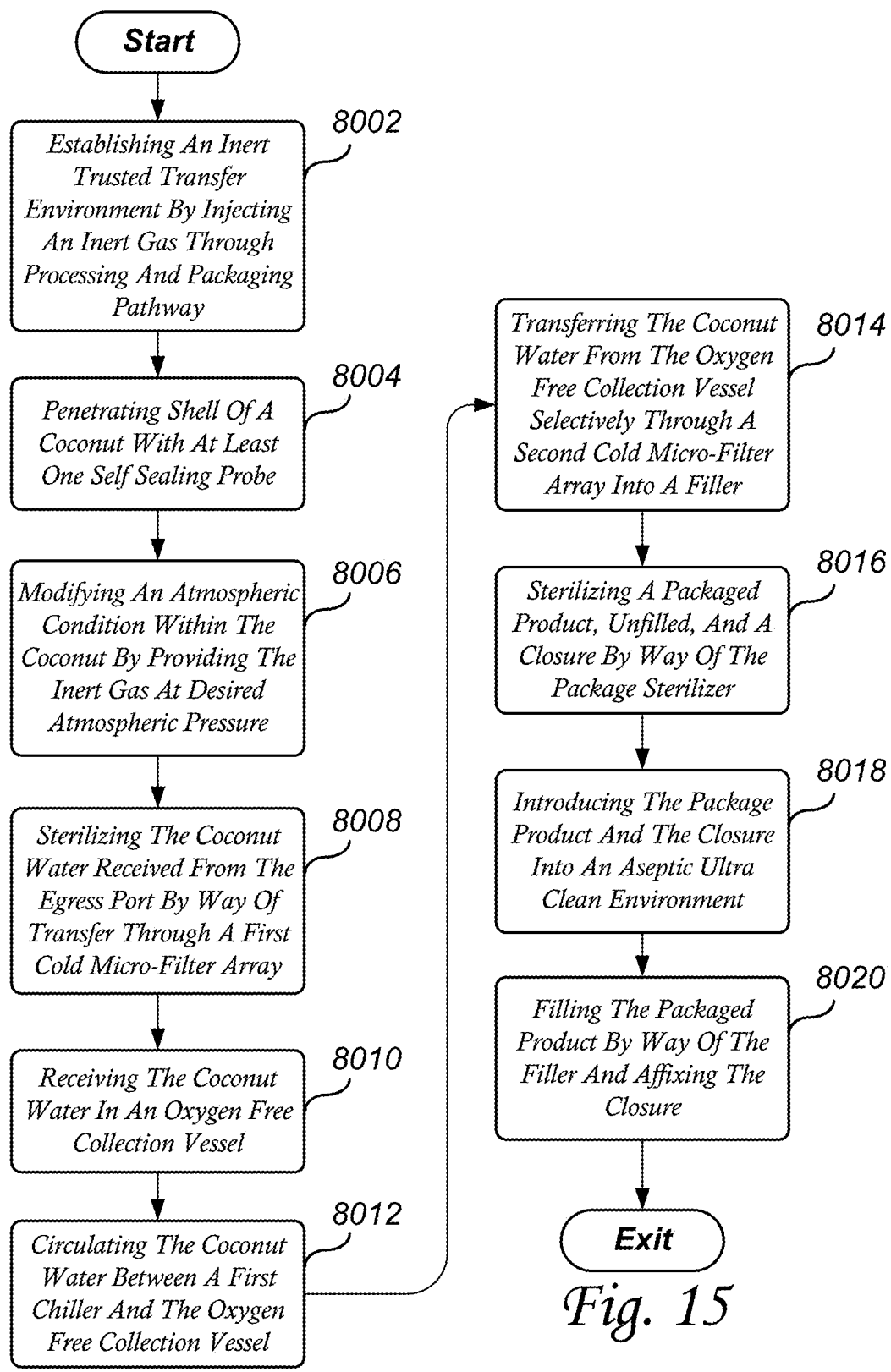

Referring to FIG. 15 there is illustrated one example of an oxygen free coconut water processing and packaging method. In an exemplary, an inert trusted transfer environment can be established within the processing and packaging pathways by injecting an inert gas. The coconut shell can be penetrated with at least one self sealing probe and the coconut water extracted by modifying the atmospheric condition with the inert gas to cause the coconut water to exit the coconut by way of an egress port. The coconut water is sterilized by passing it through a first cold micro-filter array and stored in an oxygen free storage vessel. The coconut water is circulated by pump through a chiller to maintain approximately a 4 degrees Celsius temperature until transfer to the filler for packaging. The method begins in block 8002.

In block 8002, an inert trusted transfer environment is established by injecting an inert gas 106 substantially throughout the oxygen free coconut water processing and packaging pathway. In this regard, injecting the inert gas 106 into the piping and processing pathways causes the oxygen in the processing system to be expelled and replaced with the inert gas 106 creating the trusted transfer environment. The advantage in the present invention is the as the coconut water passes through the processing and packaging equipment it is not exposed to oxygen. The method continues in block 8004.

In block 8004, the shell of a coconut 102 is penetrated with at least one of a self sealing probe 200, the self sealing probe 200 forming a seal between shell of the coconut 102 and the outer surface of the self sealing probe 200 preventing non-inert gases from ingress into the coconut 102 contacting the coconut water 104 therein and preventing the coconut water 104 from egress along the outer surface of the self sealing probe 200, the self sealing probe 200 further comprising at least one of an egress port 248. The method moves to block 8006.

In block 8006, an atmospheric condition within the coconut 102 is modified by providing the inert gas 106 by way of an inert gas source 222 at desired atmospheric pressure through a gas inlet 240 into the coconut 102, the atmospheric condition being selected to engender flow of the coconut water 104 through the egress port 248. In an exemplary embodiment such modified atmospheric condition can be creating a positive pressure within the coconut by injecting the inert gas forcing the coconut water to egress through the egress port 248. In the alternative, the inert gas can be provide in a manner so that the coconut water is removed by vacuum force though the egress port and the inert gas is provide to prevent a negative pressure from occurring within the coconut 102. Other exemplary embodiment can choose other modified atmospheric conditions, as may be required and/or desired in a particular embodiment. The method moves to block 8008.

In block 8008, the coconut water received from the egress port is sterilized by way of transfer through a first cold micro-filter array. In an exemplary embodiment and as illustrated in at least FIG. 7F, the first cold micro-filter array further can comprise first plurality of separate membranes 224A-D, each of the first plurality of membranes can have at least one of a pore 276A-D of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment. The method moves to block 8010.

In block 8010, the coconut water 104 is received in an oxygen free collection vessel 218. The method moves to block 8012.

In block 8012, the coconut water is circulated by pump between a first chiller 260 and the oxygen free collection vessel 218 to maintain the coconut water 104 at a predetermined chill temperature. In an exemplary, for example and not a limitation, the predetermined chill temperature can be approximately 4 degrees Celsius. The method moves to block 8014.

In block 8014, the coconut water 104 is transferred from the oxygen free collection vessel 218 selectively through a second cold micro-filter array 224E-F into a filler 226. In an exemplary embodiment and as illustrated in at least FIG. 7F, the second cold micro-filter array further can comprise a second plurality of separate membranes 224A-D each of the second plurality of membranes can have at least one of a pore 276A-D of predetermined size through which only the coconut water particles smaller than the pore size pass. The second plurality of membranes can be arranged from largest pore size 276A at the coconut water 104A entry point to smallest pore size 276D at the coconut water 104B exit point, wherein the second plurality of separate membranes are configured in progressively smaller pore sizes 276A is greater than 276B which is greater than 276C which is greater than 276D to reduce the second plurality of membranes from clogging while also removing particulates and pathogens from the coconut water to render the coconut water sterile. There can be as many second plurality of separate membranes as required in the array. In an exemplary embodiment, pore sizes can range from 20 microns to 0.1 microns. There can be any number of second plurality of separate membranes in the array as required. Furthermore, such cold micro-filtration can utilize hollow fiber tube, as may be required and/or desired in a particular embodiment. The method moves to block 8016.

In block 8016, a packaged product, unfilled, and a closure are sterilized by way of the package sterilizer 256. Such sterilization can be but chemical wash or other method, as may be required and/or desired in a particular embodiment. The method moves to block 8018.

In block 8018, the packaged product and the closure are introduced into an aseptic ultra clean environment 270, the filler 226 is located within the aseptic ultra clean environment. The method moves to block 8020.

In block 8020, the packaged product is filled by way of the filler 226 and the closure 264 is affixed to the packaged product within the aseptic ultra clean environment 270. The method is then exited.

Figure 16:
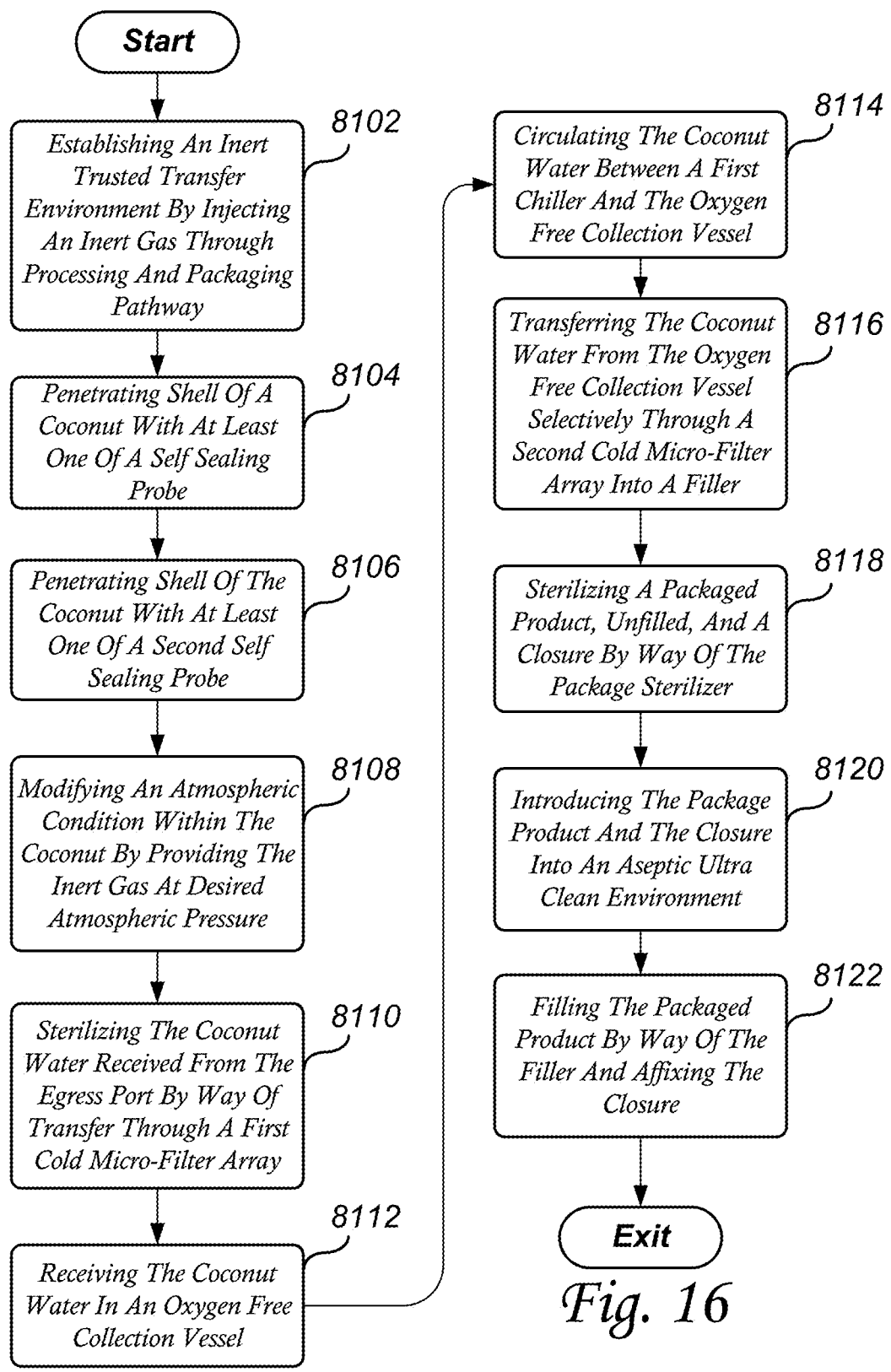

Referring to FIG. 16 there is illustrated one example of an oxygen free coconut water processing and packaging method. In an exemplary, an inert trusted transfer environment can be established within the processing and packaging pathways by injecting an inert gas. The coconut shell can be penetrated with at least two self sealing probes and the coconut water extracted by modifying the atmospheric condition with the inert gas 106 to cause the coconut water to exit the coconut by way of an egress port 248. The coconut water is sterilized by passing it through a first cold micro-filter array and stored in an oxygen free storage vessel. The coconut water is circulated by pump through a chiller to maintain approximately a 4 degrees Celsius temperature until transfer to the filler for packaging. The method begins in block 8102.

In block 8102, an inert trusted transfer environment is established by injecting an inert gas 106 substantially throughout the oxygen free coconut water processing and packaging pathway. In this regard, injecting the inert gas 106 into the piping and processing pathways causes the oxygen in the processing system to be expelled and replaced with the inert gas 106 creating the trusted transfer environment. The advantage in the present invention is the as the coconut water passes through the processing and packaging equipment it is not exposed to oxygen. The method continues in block 8104.

In block 8104, the shell of a coconut 102 is penetrated with at least one of a self sealing probe 200, the self sealing probe 200 forming a seal between shell of the coconut 102 and the outer surface of the self sealing probe 200 preventing non-inert gases from ingress into the coconut 102 contacting the coconut water 104 therein and preventing the coconut water 104 from egress along the outer surface of the self sealing probe 200, the self sealing probe 200 further comprising at least one of an egress port 248. The method moves to block 8106.

In block 8106, the shell of the coconut 102 is penetrated with at least one of a second self sealing probe, the second self sealing probe further comprising a gas inlet. The method moves to block 8108.

In block 8108, an atmospheric condition within the coconut 102 is modified by providing the inert gas 106 by way of an inert gas source 222 at desired atmospheric pressure through the gas inlet 240 into the coconut 102, the atmospheric condition being selected to engender flow of the coconut water 104 through the egress port 248. In an exemplary embodiment such modified atmospheric condition can be creating a positive pressure within the coconut by injecting the inert gas forcing the coconut water to egress through the egress port 248. In the alternative, the inert gas can be provide in a manner so that the coconut water is removed by vacuum force though the egress port and the inert gas is provide to prevent a negative pressure from occurring within the coconut 102. Other exemplary embodiment can choose other modified atmospheric conditions, as may be required and/or desired in a particular embodiment. The method moves to block 8110.

In block 8110, the coconut water received from the egress port is sterilized by way of transfer through a first cold micro-filter array. In an exemplary embodiment and as illustrated in at least FIG. 7F, the first cold micro-filter array further can comprise first plurality of separate membranes 224A-D, each of the first plurality of membranes can have at least one of a pore 276A-D of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment. The method moves to block 8112.

In block 8112, the coconut water 104 is received in an oxygen free collection vessel 218. The method moves to block 8014.

In block 8114, the coconut water is circulated by pump between a first chiller 260 and the oxygen free collection vessel 218 to maintain the coconut water 104 at a predetermined chill temperature. In an exemplary, for example and not a limitation, the predetermined chill temperature can be approximately 4 degrees Celsius. The method moves to block 8116.

In block 8116, the coconut water 104 is transferred from the oxygen free collection vessel 218 selectively through a second cold micro-filter array 224E-F into a filler 226. In an exemplary embodiment and as illustrated in at least FIG. 7F, the second cold micro-filter array further can comprise second plurality of separate membranes 224A-D each of the second plurality of membranes can have at least one of a pore 276A-D of predetermined size through which only the coconut water particles smaller than the pore size pass. The second plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the second plurality of membranes from clogging while also removing particulates and pathogens from the coconut water to render the coconut water sterile. There can be as many second plurality of separate membranes as required in the array. In an exemplary embodiment, pore sizes can range from 20 microns to 0.1 microns. There can be any number of second plurality of separate membranes in the array as required. Furthermore, such cold micro-filtration can utilize hollow fiber tube, as may be required and/or desired in a particular embodiment. The method moves to block 8118.

In block 8118, a packaged product, unfilled, and a closure are sterilized by way of the package sterilizer 256. Such sterilization can be but chemical wash or other method, as may be required and/or desired in a particular embodiment. The method moves to block 8120.

In block 8120, the packaged product and the closure are introduced into an aseptic ultra clean environment 270, the filler 226 is located within the aseptic ultra clean environment. The method moves to block 8122.

In block 8122, the packaged product is filled by way of the filler 226 and the closure 264 is affixed to the packaged product within the aseptic ultra clean environment 270. The method is then exited.

Figure 17A:
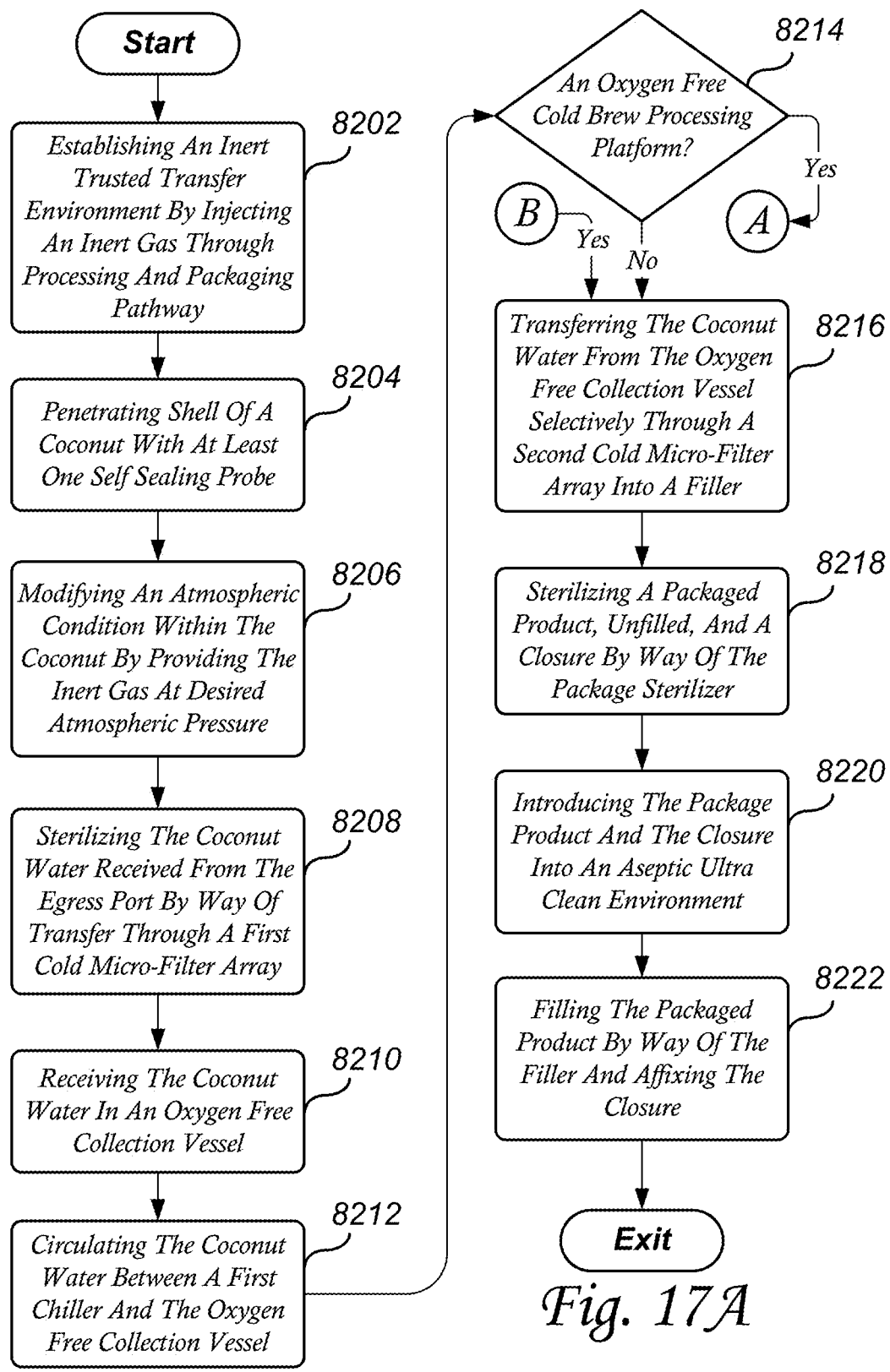

Referring to FIG. 17A-B there is illustrated one example of an oxygen free coconut water processing and packaging method. In an exemplary, an inert trusted transfer environment can be established within the processing and packaging pathways by injecting an inert gas. The coconut shell can be penetrated with at least one self sealing probe and the coconut water extracted by modifying the atmospheric condition with the inert gas 106 to cause the coconut water to exit the coconut by way of an egress port 248. The coconut water is sterilized by passing it through a first cold micro-filter array and stored in an oxygen free storage vessel. The coconut water is circulated by pump through a chiller to maintain approximately a 4 degrees Celsius temperature until transfer to either a second cold micro-filter array into a filler; or an oxygen free cold brew processing platform and then through the second cold micro-filter array into the filler. The method begins in block 8202.

In block 8102, an inert trusted transfer environment is established by injecting an inert gas 106 substantially throughout the oxygen free coconut water processing and packaging pathway. In this regard, injecting the inert gas 106 into the piping and processing pathways causes the oxygen in the processing system to be expelled and replaced with the inert gas 106 creating the trusted transfer environment. The advantage in the present invention is the as the coconut water passes through the processing and packaging equipment it is not exposed to oxygen. The method continues in block 8204.

In block 8204, the shell of a coconut 102 is penetrated with at least one of a self sealing probe 200, the self sealing probe 200 forming a seal between shell of the coconut 102 and the outer surface of the self sealing probe 200 preventing non-inert gases from ingress into the coconut 102 contacting the coconut water 104 therein and preventing the coconut water 104 from egress along the outer surface of the self sealing probe 200, the self sealing probe 200 further comprising at least one of an egress port 248. The method moves to block 8206.

In block 8206, an atmospheric condition within the coconut 102 is modified by providing the inert gas 106 by way of an inert gas source 222 at desired atmospheric pressure through the gas inlet 240 into the coconut 102, the atmospheric condition being selected to engender flow of the coconut water 104 through the egress port 248. In an exemplary embodiment such modified atmospheric condition can be creating a positive pressure within the coconut by injecting the inert gas forcing the coconut water to egress through the egress port 248. In the alternative, the inert gas can be provide in a manner so that the coconut water is removed by vacuum force though the egress port and the inert gas is provide to prevent a negative pressure from occurring within the coconut 102. Other exemplary embodiment can choose other modified atmospheric conditions, as may be required and/or desired in a particular embodiment. The method moves to block 8110.

In block 8208, the coconut water received from the egress port is sterilized by way of transfer through a first cold micro-filter array. In an exemplary embodiment and as illustrated in at least FIG. 7F, the first cold micro-filter array further can comprise first plurality of separate membranes 224A-D, each of the first plurality of membranes can have at least one of a pore 276A-D of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment. The method moves to block 8210.

In block 8210, the coconut water 104 is received in an oxygen free collection vessel 218. The method moves to block 8212.

In block 8212, the coconut water is circulated by pump between a first chiller 260 and the oxygen free collection vessel 218 to maintain the coconut water 104 at a predetermined chill temperature. In an exemplary, for example and not a limitation, the predetermined chill temperature can be approximately 4 degrees Celsius. The method moves to decision block 8214.

In decision block 8214, a is made to transfer the coconut water through either a second cold micro-filter array or an oxygen free cold brew processing platform and then through the second cold micro-filter array into the filler. If the determination is in the affirmative then the method moves to block 8224. If the determination is in the negative the method continues in block 8216. In an exemplary embodiment the coconut water can be selectively switched between processing for packaging as coconut water or diverting the coconut water to an oxygen free cold brew processing platform.

In block 8216, the coconut water 104 is transferred from the oxygen free collection vessel 218 selectively through a second cold micro-filter array 224E-F into a filler 226. In an exemplary embodiment and as illustrated in at least FIG. 7F, the second cold micro-filter array further can comprise second plurality of separate membranes 224A-D each of the second plurality of membranes can have at least one of a pore 276A-D of predetermined size through which only the coconut water particles smaller than the pore size pass. The second plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the second plurality of membranes from clogging while also removing particulates and pathogens from the coconut water to render the coconut water sterile. There can be as many second plurality of separate membranes as required in the array. In an exemplary embodiment, pore sizes can range from 20 microns to 0.1 microns. There can be any number of second plurality of separate membranes in the array as required. Furthermore, such cold micro-filtration can utilize hollow fiber tube, as may be required and/or desired in a particular embodiment. The method moves to block 8218.

In block 8218, a packaged product, unfilled, and a closure are sterilized by way of the package sterilizer 256. Such sterilization can be but chemical wash or other method, as may be required and/or desired in a particular embodiment. The method moves to block 8220.

In block 8220, the packaged product and the closure are introduced into an aseptic ultra clean environment 270, the filler 226 is located within the aseptic ultra clean environment. The method moves to block 8222.

In block 8222, the packaged product is filled by way of the filler 226 and the closure 264 is affixed to the packaged product within the aseptic ultra clean environment 270. The method is then exited.

Referring to FIG. 17B and with reference to at least FIG. 7E, there is illustrated an exemplary embodiment of an oxygen free coconut water processing and packaging method that includes steps for supplementing the method with an oxygen free cold brew processing method. An advantage of the oxygen free cold brew processing platform is that under cold brew conditions of the present invention, including lower temperatures in an oxygen free environment, brew time is reduced by about 75% and superior taste is maintained versus ambient or heated brew temperature brew conditions which destroy flavor, nutrients, and other compounds. The method begins in block 8224.

In block 8224, a brew ingredient 278 such as coffee, tea, floras, spices, fruit/vegetable, combinations thereof and/or other brew ingredient. Such flora and spices can include, for example and not a limitation, rosemary, cardamom, ginger, and mint. Fruit infusion can include, for example and not a limitation, orange, lemon, lime, berry (i.e. strawberry, blueberry, other), and other. Vegetable infusion can include, for example and not a limitation, cucumber, bottle gourd, and other. The brew ingredient 278 ingredient is placed into a plurality of brew ingredient baskets 270A-F, a plurality of sealable brew tanks 266A-C are operationally related to a third chiller 224, a brew density sensor 268, and a plurality of general purpose valves 220A and 220B. Each of the plurality of sealable brew tanks 266A-C further comprising at least one of the plurality of brew ingredient baskets illustrated as 270A-F.

In an exemplary embodiment, a temperature sensor 286 is operationally related to the third chiller 224. In this regard, the temperature of the coconut water during brewing is maintained optimally between 2 degrees and 4 degrees Celsius, an advantage in the present invention being brewing at the lowest possible temperature improves taste quality of the final beverage product. It also helps minimize microbial growth. Such a temperature sensor 286 can be manufactured by PYROMATION and/or other types, kinds, or manufacturers as may be required and/or desired in a particular embodiment. The method moves to block 8226.

In block 8226, the coconut water 104 is received from the oxygen free collection vessel 218 into the plurality of sealable brew tanks 266A-C. The method moves to block 8228.

In block 8228, the coconut water 104 is infused with the brew ingredients 278 by circulating the coconut water 104 through the brew ingredients 278 and between the plurality of sealable brew tanks 266A-C, the third chiller 224, and the brew density sensor 268. Such a brew density sensor 268 can be a total dissolved solids (TDS) sensor manufactured by HM DIGITAL and/or other type, kinds, or manufacturers as may be required and/or desired in a particular embodiment. The method moves to block 8230.

In block 8230, the coconut water is transferred to an oxygen free brew complete storage tank 230 when the brew density sensor 268 indicates a predetermined brew density has been achieved. The brew density sensor 268 can be a total dissolved solids (TDS) sensor or other type or kind of sensor, as may be required and/or desired in a particular embodiment. The method then moves to block 8216.

Referring to FIG. 18 there is illustrated exemplary embodiments of an oxygen free coconut water processing and packaging method. Such exemplary embodiments can be interchangeably used with the methods of the present invention.

In block 8302 and with reference to at least FIG. 7B, the coconut water is transferred from the egress port 248 through a third cold micro-filter array 224A and a second chiller 260A into an oxygen free storage vessel 230 prior to transferring the coconut water 104 to the first cold micro-filter array 224B-E. In an exemplary embodiment, as example and not a limitation, the second chiller 260A chills the coconut water 104 to approximately 10 degrees Celsius.

In block 8304, the coconut water 104 is transferred from the first micro-filter array illustrated in FIG. 7A as 224A-D and in FIG. 7B as 224B-224E through an ultraviolet light sterilizer 258. Such ultraviolet light sterilizer can be the type manufactured by ATLANTIUM or other types or kind of ultraviolet light sterilizer, as may be required and/or desired in a particular embodiment.

In block 8306 and with reference to at least FIG. 7D, the step of circulating the coconut water 104 between the first chiller 260 and the oxygen free collection vessel 218 further comprising circulating the coconut water 104 through an ultraviolet light sterilizer 258B prior to returning the coconut water 104 to the oxygen free collection vessel.

In block 8308, the first cold micro-filter array further can comprise first plurality of separate membranes 224A-D, each of the first plurality of membranes can have at least one of a pore 276A-D of predetermined size through which only the coconut water particles smaller than the pore size pass. The first plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of first plurality of separate membranes as required in the array. In an exemplary embodiment, pore sizes can range from 20 microns to 0.1 microns. Furthermore, such cold micro-filtration can utilize hollow fiber tube, as may be required and/or desired in a particular embodiment.

In block 8310, in an exemplary embodiment, pore sizes can range from 20 microns to 0.1 microns.

In block 8312, the second cold micro-filter array further can comprise first plurality of separate membranes 224A-D, each of the second plurality of membranes can have at least one of a pore 276A-D of predetermined size through which only the coconut water particles smaller than the pore size pass. The second plurality of membranes can be arranged from largest pore size 276A at the coconut water 104A entry point to smallest pore size 276D at the coconut water 104B exit point, wherein the first plurality of separate membranes are configured in progressively smaller pore sizes 276A is greater than 276B which is greater than 276C which is greater than 276D to reduce the first plurality of membranes from clogging while also removing particulates and pathogens from the coconut water to render the coconut water sterile. There can be any number of second plurality of separate membranes as required in the array. In an exemplary embodiment, pore sizes can range from 20 microns to 0.1 microns.

In block 8314, the shell of the coconut is penetrated with at least one of a second self sealing probe, the second self sealing probe further comprising a gas inlet.

In block 8316, the step of filling further comprising maintaining a predetermine head space in the filler to mitigate risk of oxygen ingress into the filler during filling of the product package. This is illustrated in at least FIG. 7C.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An oxygen free coconut water processing and packaging method, the method comprising the steps of:
   establishing an inert transfer environment by injecting an inert gas substantially throughout the oxygen free coconut water processing and packaging pathway;
   penetrating shell of a coconut with at least one of a self sealing probe, the self sealing probe forming a seal between shell of the coconut and the outer surface of the self sealing probe preventing non-inert gases from ingress into the coconut contacting the coconut water therein and preventing the coconut water from egress along the outer surface of the self sealing probe, the self sealing probe further comprising at least one of an egress port and a gas inlet;
   modifying an atmospheric condition within the coconut by providing the inert gas by way of an inert gas source at predetermined atmospheric pressure through the gas inlet into the coconut, the atmospheric condition being selected to engender flow of the coconut water through the egress port;
   sterilizing the coconut water received from the egress port by way of transfer through a first cold micro-filter array;
   receiving the coconut water in an oxygen free collection vessel;
   transferring the coconut water from the oxygen free collection vessel selectively through a second cold micro-filter array into a filler;
   sterilizing a packaged product, unfilled, and a closure by way of the package sterilizer;
   introducing the packaged product and the closure into an aseptic or ultra clean environment, the filler is located within the aseptic or ultra clean environment; and
   filling the packaged product by way of the filler and affixing the closure to the packaged product within the aseptic or ultra clean environment.

2. The method in accordance with claim 1, wherein step of sterilizing the coconut water further comprising:
   transferring the coconut water from the egress port through a third cold micro-filter array and a first chiller into an oxygen free storage vessel prior to transferring the coconut water to the first cold micro-filter array.

3. The method in accordance with claim 1, wherein step of sterilizing the coconut water further comprising:
   transferring the coconut water from the first micro-filter array through an ultraviolet light sterilizer.

4. The method in accordance with claim 1, wherein the step of receiving the coconut water in an oxygen free collection vessel further comprising:
   circulating the coconut water through an ultraviolet light sterilizer prior to returning the coconut water to the oxygen free collection vessel.

5. The method in accordance with claim 1, wherein the first cold micro-filter array further comprising a first plurality of separate membranes, each of the first plurality of membranes having at least one of a pore of predetermined size through which only the coconut water particles smaller than the pore size pass, the first plurality of membranes being arranged from largest pore size at the coconut water entry point to smallest pore size at the coconut water exit point, wherein the first plurality of separate membranes are configured in progressively smaller pore sizes to reduce the first plurality of membranes from clogging while also removing particulates and pathogens from the coconut water to render the coconut water sterile.

6. The method in accordance with claim 5, wherein the pore size ranges from 20 microns to 0.1 microns.

7. The method in accordance with claim 1, wherein the second cold micro-filter array further comprising a second plurality of separate membranes, each of the second plurality of membranes having at least one of a pore of predetermined size through which only the coconut water particles smaller than the pore size pass, the second plurality of membranes being arranged from largest pore size at the coconut water entry point to smallest pore size at the coconut water exit point, wherein the second plurality of separate membranes are configured in progressively smaller pore sizes to reduce the second plurality of membranes from clogging while also removing particulates and pathogens from the coconut water to render the coconut water sterile.

8. The method in accordance with claim 7, wherein the pore size ranges from 20 microns to 0.1 microns.

9. An oxygen free coconut water processing and packaging method, the method comprising the steps of:
   establishing an inert transfer environment by injecting an inert gas substantially throughout the oxygen free coconut water processing and packaging pathway;
   penetrating shell of a coconut with at least one of a self sealing probe, the self sealing probe forming a seal between shell of the coconut and outer surface of the self sealing probe preventing non-inert gases from ingress into the coconut contacting the coconut water therein and preventing the coconut water from egress along outer surface of the self sealing probe, the self sealing probe further comprising an egress port;

penetrating shell of the coconut with at least one of a second self sealing probe, the second self sealing probe further comprising a gas inlet;

modifying an atmospheric condition within the coconut by providing the inert gas by way of an inert gas source at predetermined atmospheric pressure through the gas inlet, the atmospheric condition being selected to engender flow of the coconut water through the egress port;

sterilizing the coconut water received from the egress port by way of transfer through a first cold micro-filter array;

receiving the coconut water in an oxygen free collection vessel;

transferring the coconut water from the oxygen free collection vessel selectively through a second cold micro-filter array into a filler;

sterilizing a packaged product, unfilled, and a closure by way of the package sterilizer;

introducing the packaged product and the closure into an aseptic or ultra clean environment, the filler is located within the aseptic or ultra clean environment; and filling the packaged product by way of the filler and affixing the closure to the packaged product within the aseptic or ultra clean environment.

10. The method in accordance with claim 9, wherein step of sterilizing the coconut water further comprising:
transferring the coconut water from the egress port through a third cold micro-filter and a first chiller into a oxygen free storage vessel prior to transferring the coconut water to the first cold micro-filter array.

11. The method in accordance with claim 9, wherein step of sterilizing the coconut water further comprising:
transferring the coconut water from the first micro-filter array through an ultraviolet light sterilizer.

12. The method in accordance with claim 9, wherein the step of receiving the coconut water in an oxygen free collection vessel further comprising:
circulating the coconut water through an ultraviolet light sterilizer prior to returning the coconut water to the oxygen free collection vessel.

13. The method in accordance with claim 9, wherein the first cold micro-filter array further comprising a first plurality of separate membranes, each of the first plurality of membranes having at least one of a pore of predetermined size through which only the coconut water particles smaller than the pore size pass, the first plurality of membranes being arranged from largest pore size at the coconut water entry point to smallest pore size at the coconut water exit point, wherein the first plurality of separate membranes are configured in progressively smaller pore sizes to reduce the first plurality of membranes from clogging while also removing particulates and pathogens from the coconut water to render the coconut water sterile.

14. The method in accordance with claim 13, wherein the pore size ranges from 20 microns to 0.1 microns.

15. The method in accordance with claim 9, wherein the second cold micro-filter array further comprising a second plurality of separate membranes, each of the second plurality of membranes having at least one of a pore of predetermined size through which only the coconut water particles smaller than the pore size pass, the second plurality of membranes being arranged from largest pore size at the coconut water entry point to smallest pore size at the coconut water exit point, wherein the second plurality of separate membranes are configured in progressively smaller pore sizes to reduce the second plurality of membranes from clogging while also removing particulates and pathogens from the coconut water to render the coconut water sterile.

16. The method in accordance with claim 15, wherein the pore size ranges from 20 microns to 0.1 microns.

17. An oxygen free coconut water processing and packaging method, the method comprising the steps of:
establishing an inert transfer environment by injecting an inert gas throughout the oxygen free coconut water processing and packaging pathway;

penetrating shell of a coconut with at least one of a self sealing probe, the self sealing probe forming a seal between shell of the coconut and the outer surface of the self sealing probe preventing non-inert gases from ingress into the coconut contacting the coconut water therein and preventing the coconut water from egress along the outer surface of the self sealing probe, the self sealing probe further comprising at least one of an egress port;

modifying an atmospheric condition within the coconut by providing the inert gas by way of an inert gas source at predetermined atmospheric pressure through a gas inlet into the coconut, the atmospheric condition being selected to engender flow of the coconut water through the egress port;

sterilizing the coconut water by way of transfer through a first cold micro-filter array;

receiving the coconut water in an oxygen free collection vessel;

transferring the coconut water from the oxygen free collection vessel selectively through either:
a second cold micro-filter array into a filler; or
an oxygen free cold brew processing platform and then through the second cold micro-filter array into the filler;

sterilizing a packaged product, unfilled, and a closure by way of the package sterilizer;

introducing the packaged product and the closure into an aseptic or ultra clean environment, the filler is located within the aseptic or ultra clean environment; and filling the packaged product by way of the filler and affixing the closure to the packaged product within the aseptic or ultra clean environment.

18. The method in accordance with claim 17, wherein step of sterilizing the coconut water further comprising:
transferring the coconut water from the egress port through a third cold micro-filter and a first chiller into a oxygen free storage vessel prior to transferring the coconut water to the first cold micro-filter array.

19. The method in accordance with claim 17, wherein step of sterilizing the coconut water further comprising:
transferring the coconut water from the first micro-filter array through an ultraviolet light sterilizer.

20. The method in accordance with claim 17, wherein the step of receiving the coconut water in an oxygen free collection vessel further comprising:
circulating the coconut water through an ultraviolet light sterilizer prior to returning the coconut water to the oxygen free collection vessel.

21. The method in accordance with claim 17, wherein the first cold micro-filter array further comprising a first plurality of separate membranes, each of the first plurality of membranes having at least one of a pore of predetermined size through which only the coconut water particles smaller than the pore size pass, the first plurality of membranes being arranged from largest pore size at the coconut water entry point to smallest pore size at the coconut water exit point, wherein the first plurality of separate membranes are configured in progressively smaller pore sizes to reduce the first plurality of membranes from clogging while also removing particulates and pathogens from the coconut water to render the coconut water sterile.

22. The method in accordance with claim 21, wherein the pore size ranges from 20 microns to 0.1 microns.

23. The method in accordance with claim 17, wherein the second cold micro-filter array further comprising a second plurality of separate membranes, each of the second plurality of membranes having at least one of a pore of predetermined size through which only the coconut water particles smaller than the pore size pass, the second plurality of membranes being arranged from largest pore size at the coconut water entry point to smallest pore size at the coconut water exit point, wherein the second plurality of separate membranes are configured in progressively smaller pore sizes to reduce the second plurality of membranes from clogging while also removing particulates and pathogens from the coconut water to render the coconut water sterile.

24. The method in accordance with claim 23, wherein the pore size ranges from 20 microns to 0.1 microns.

25. The method in accordance with claim 17, further comprising:

penetrating shell of the coconut with at least one of a second self sealing probe, the second self sealing probe further comprising the gas inlet.

26. The method in accordance with claim 17, the oxygen free cold brew processing platform further comprising:

placing at least one of a brew ingredient into a plurality of brew ingredient baskets, a plurality of sealable brew tanks are operationally related to a second chiller, a brew density sensor, and each of the plurality of sealable brew tanks further comprising at least one of the plurality of brew ingredient baskets;

receiving the coconut water from the oxygen free collection vessel into the plurality of sealable brew tanks;

infusing the coconut water with the brew ingredients by circulating the coconut water through the brew ingredients and between the plurality of sealable brew tanks, the second chiller, and the brew density sensor;

transferring the coconut water to an oxygen free brew complete storage tank when the brew density sensor indicates a predetermined brew density has been achieved.

27. The method in accordance with claim 17, the step of filling further comprising:

maintaining predetermine head space in the filler to mitigate risk of oxygen ingress into the filler during filling of the product package.

* * * * *